United States Patent
Karam et al.

(10) Patent No.: US 7,111,089 B2
(45) Date of Patent: Sep. 19, 2006

(54) PROGRAMMABLE SCHEDULER FOR DIGITAL SIGNAL PROCESSOR

(75) Inventors: Margot Karam, Mount Prospect, IL (US); Brett Lindsley, Wheaton, IL (US)

(73) Assignee: Motorola, Inc., Schaumburg, IL (US)

( * ) Notice: Subject to any disclaimer, the term of this patent is extended or adjusted under 35 U.S.C. 154(b) by 858 days.

(21) Appl. No.: 10/327,835

(22) Filed: Dec. 23, 2002

(65) Prior Publication Data

US 2004/0123295 A1    Jun. 24, 2004

(51) Int. Cl.
G06F 13/26 (2006.01)
G06F 13/24 (2006.01)

(52) U.S. Cl. .................. 710/48; 710/264; 710/260; 710/266; 712/35; 712/229; 718/103

(58) Field of Classification Search ............ 712/1–300; 710/1–317; 718/100–108
See application file for complete search history.

(56) References Cited

U.S. PATENT DOCUMENTS

| | | | |
|---|---|---|---|
| 4,964,000 A | | 10/1990 | Kanota et al. |
| 5,303,369 A | * | 4/1994 | Borcherding et al. ....... 718/104 |
| 5,465,335 A | | 11/1995 | Anderson |
| 5,577,250 A | * | 11/1996 | Anderson et al. .......... 718/100 |
| 5,768,613 A | * | 6/1998 | Asghar ..................... 712/35 |
| 5,832,262 A | | 11/1998 | Johnson et al. |
| 5,937,199 A | | 8/1999 | Temple |
| 6,006,320 A | | 12/1999 | Parady |
| 6,108,744 A | * | 8/2000 | Lebee ........................ 710/266 |
| 6,230,255 B1 | * | 5/2001 | Asghar et al. ................ 712/32 |
| 6,567,910 B1 | * | 5/2003 | Tessarolo et al. .......... 712/227 |
| 6,633,940 B1 | * | 10/2003 | Alasti et al. ................ 710/262 |
| 6,915,517 B1 | * | 7/2005 | Imamura et al. ........... 718/103 |
| 6,986,066 B1 | * | 1/2006 | Morrow et al. ............. 713/320 |
| 7,020,879 B1 | * | 3/2006 | Nemirovsky et al. ....... 718/107 |
| 2002/0073129 A1 | * | 6/2002 | Wang et al. ................ 709/102 |
| 2003/0120702 A1 | * | 6/2003 | Jahnke ....................... 709/102 |

FOREIGN PATENT DOCUMENTS

EP    465054 A1  *  1/1992

OTHER PUBLICATIONS

Lui Sha, Ragunathan Rajkumar, John P. Lhoczky, "*Priority Inheritance Protocols: An Approach to Real-Time Synchronization*", IEEE Transactions on Computers, vol. 29, No. 9, Sep. 1990, pp. 1175-1185.

Jia Xu, David Lorge Parnas, "*Scheduling Processes with Release Times, Deadlines, Precedence, and Exclusion Relations*", IEEE Transactions on Software Engineering, vol. 16, No. 3, Mar. 1990, pp. 360-369.

* cited by examiner

*Primary Examiner*—Lewis A. Bullock, Jr.

(57) ABSTRACT

A digital signal processor operates in conjunction with a scheduler hardware module and a scheduler software module in executing a highest priority runnable event among a plurality of events. The scheduler hardware module communicates an interrupt request signal to the DSP that is indicative of any change in a highest priority runnable event. The scheduler software module is executed by the DSP in response to the interrupt request signal indicating a change in highest priority runnable event. An execution of the scheduler software module by the DSP implements one of a various modes of an interrupt request routine.

35 Claims, 16 Drawing Sheets

PROGRAMMABLE SCHEDULER FOR DIGITAL SIGNAL PROCESSOR

FIELD OF THE INVENTION

The present invention generally relates to the microprocessors. More specifically, the present invention relates to a scheduler for a digital signal processor ("DSP").

BACKGROUND OF THE INVENTION

Currently, telecommunication companies are facing a big challenge in the design of multi-standard phones, and more specifically Software Definable Radios ("SDR"). In particular, the subscriber side of SDR is struggling with a huge and expansive fully hardware implemented modem integrated circuit ("IC") while the infrastructure side of SDR is trying to get rid of expansive multiple racks. The new trend is to move toward a flexible solution.

The interest in a software implementation for modem functions of SDR has grown in the last few years due to emerging re-configurable modem technologies and recent research advances in the design of application specific processors handling high data rate processing. One of the most efficient ways to design software for complex real-time systems is to decompose them in terms of tasks. The problems that remain to be solved are how to schedule these tasks and how to design a scheduler for this purpose.

The present invention advances the art by contributing a new and unique scheduler that can implement a range of known scheduling and synchronization algorithms to satisfy the need of present and future computer systems, particularly in the area of communications.

SUMMARY OF THE INVENTION

The present invention is directed to a scheduler that performs the main scheduling functions. This implementation decreases drastically the scheduler kernel run time and eliminates false and costly interruptions to the DSP. The present invention can be operated to control (1) various static and dynamic scheduling algorithms for preemptive and non-preemptive systems, (2) precedence and exclusion relations between tasks, and/or (3) semaphores and synchronization algorithms such as priority inheritance.

One form of the present invention is a system comprising a DSP, a scheduler hardware module, and a scheduler software module. In operation, the scheduler hardware module communicates an interrupt request signal to the DSP that is indicative of any change in a highest priority runnable event among a plurality of events. The scheduler software module is executed by the DSP in response to the interrupt request signal indicating a change in the highest priority runnable event. An execution of the scheduler software module implements an interrupt request routine.

The foregoing form as well as other forms, features and advantages of the present invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
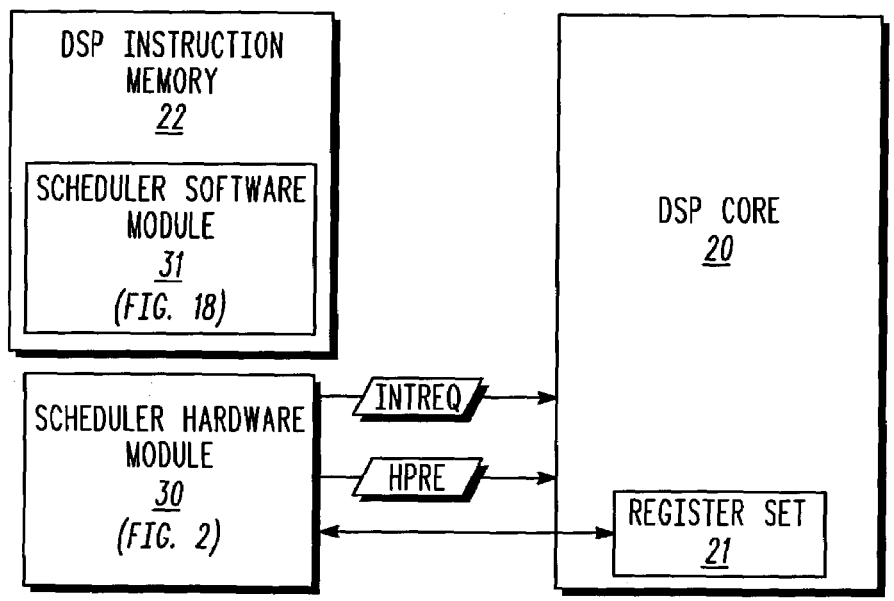
FIG. 1 illustrates one embodiment of a scheduling system in accordance with the present invention.

FIG. 1 illustrates a computer system comprising a DSP core 20, a DSP instruction memory 22, and a new and unique scheduler including a scheduler hardware module 30 and a scheduler software module 31 for facilitating an execution of a variety of events by DSP core 20. Each event is either a hardware based event (synchronous or asynchronous) or a software based event.

In operation, the scheduler hardware module 30 continually derives the identity of a highest priority runnable event among a plurality of events whereby the scheduler hardware module 30 communicates a highest priority runnable event signal HPRE to DSP core 20 as an indication of the identity of the highest priority runnable event and an interrupt request signal INTREQ to DSP 20 as an indication of a change in the identity of the highest priority runnable able event. In response to an indication by the interrupt request signal INTREQ of a change in the highest priority runnable event, the DSP core 20 controls an execution of the scheduler software module 31 to thereby implement an appropriate interrupt service routine for running the event indicated by the highest priority runnable event signal HPRE. In one embodiment, an executable form of the scheduler software module 31 (i.e., computer readable code) is stored in DSP instruction memory 22, which can be in the form of a solid-state memory (e.g., RAM, ROM or EEPROM), a magnetic memory (e.g., a floppy disk, a hard disk or tape), an optical memory (e.g., a CDROM or DVD) or another form as would occur to one skilled in the art.

In various embodiments of the DSP core 20 and the scheduler hardware module 30, the DSP core 20 is capable of programming the scheduler hardware module 30. One such embodiment as illustrated in FIG. 1 involves a bidirectional communication between the scheduler hardware module 30 and a register set 21 employed by DSP core 20. This communication enables the DSP core 20 to program the scheduler hardware module 30 via register set 21 as will be appreciated by those having ordinary skill in the art in view of a subsequent description herein of various embodiments of scheduler hardware module 30. Each register within register set 21 as subsequently described herein may be written and/or read by hardware, software, and any combination of hardware and software.

Scheduler Hardware Module

Figure 2:
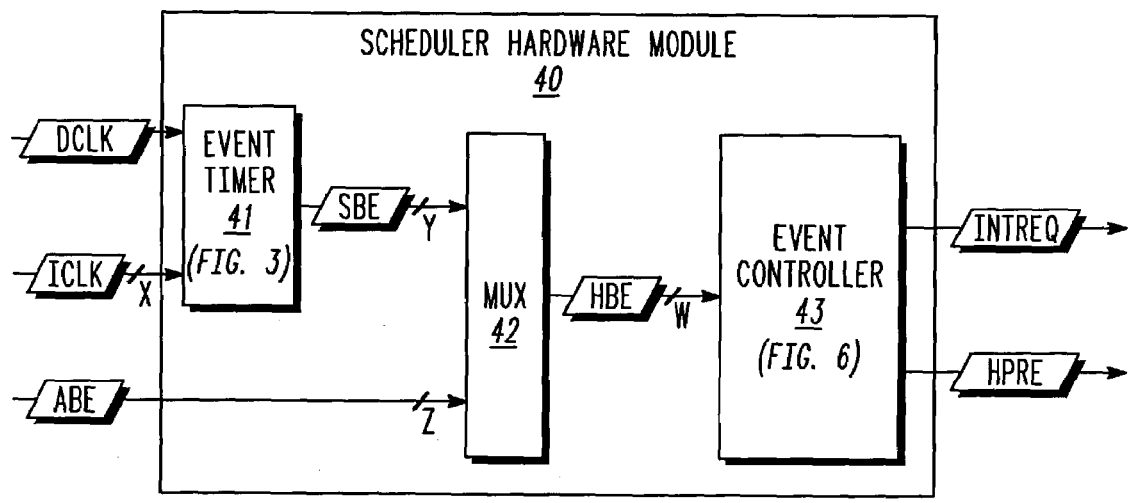
FIG. 2 illustrates one embodiment of a scheduler hardware module in accordance with the present invention.

FIG. 2 illustrates a scheduler hardware module 40 as one embodiment of the scheduler hardware module 30 (FIG. 1). The scheduler hardware module 40 employs an event timer 41, a conventional mutliplexer ("MUX") 42, and an event controller 43 for deriving the identity of the highest priority runnable event and communicating the interruption signal INTREQ and the highest priority event signal HPRE to the DSP core 20 (FIG. 1). In operation, the event timer 41 receives a DSP clock signal DCLK, and X number of input clock signals ICLK, where X 1. The source(s) of the input clock signal(s) ICLK are based on an operational environment of scheduler hardware module 40, such as, for example, the source(s) of the input clock signal(s) ICLK can be communication systems when scheduler hardware module 40 operates in a portable communication environment.

In response to the clock signal(s) ICLK, the event timer 41 generates Y number of synchronous based event signal(s) SBE indicative of hardware based events that are synchronized with the DSP clock DCLK, where Y 1. Examples of such hardware based events include, but are not limited to a hardware based event involving an analog to digital conversion and a hardware based event involving a loading of frames into a buffer. Event timer 41 communicates the synchronous based event signal(s) SBE to MUX 42.

MUX 42 further receives Z number of asynchronous based event signal(s) ABE indicative of hardware based events that are not synchronized with the DSP clock DCLK, where Z 1. Examples of such hardware based events include, but are not limited to a hardware based event involving an emergency request for service and a hardware based event involving a transfer of data. The source(s) of asynchronous based event signal(s) ABE are also based on an operational environment of scheduler hardware module 40.

The DSP core 20 communicates conventional selection signals (not shown) to MUX 42 whereby MUX 42 selectively communicates W number of hardware based event signal(s) HBE to the event controller 43, where W 1. Based on the selection signals, the hardware based event signal(s) HBE includes one or more synchronous based event signal(s) SBE, and/or one or more asynchronous based event signal(s) ABE. The event controller 43 identifies the highest priority runnable event among the hardware based event(s) represented by the hardware based event signal(s) HBE, and generates the higher priority runnable event signal HPRE as an indication of the identified highest priority runnable event.

In a first alternative embodiment of scheduler hardware module 40, the event timer 41 may be omitted when the event controller 43 is being operated to process hardware based events signals HBE exclusively in the form the asynchronous based events ABE. In such a case, the MUX 42 can also be omitted whereby the asynchronous based event signal(s) ABE are directly communicated to the event controller 43 as the hardware based event signal(s) HBE.

In a second alternative embodiment of scheduler hardware module 40, the MUX 42 may be omitted when the event controller 43 is being operated to process hardware based events signals HBE exclusively in the form the synchronous based events SBE. In such a case, the event timer 41 directly communicates the synchronous based event signal(s) SBE to the event controller 43 as the hardware based event signal(s) HBE.

In a third alternative embodiment of scheduler hardware module 40, the event timer 41 and MUX 42 may be omitted when the event controller 43 is being operated to exclusively process software based events.

Event Timer

Figure 3:
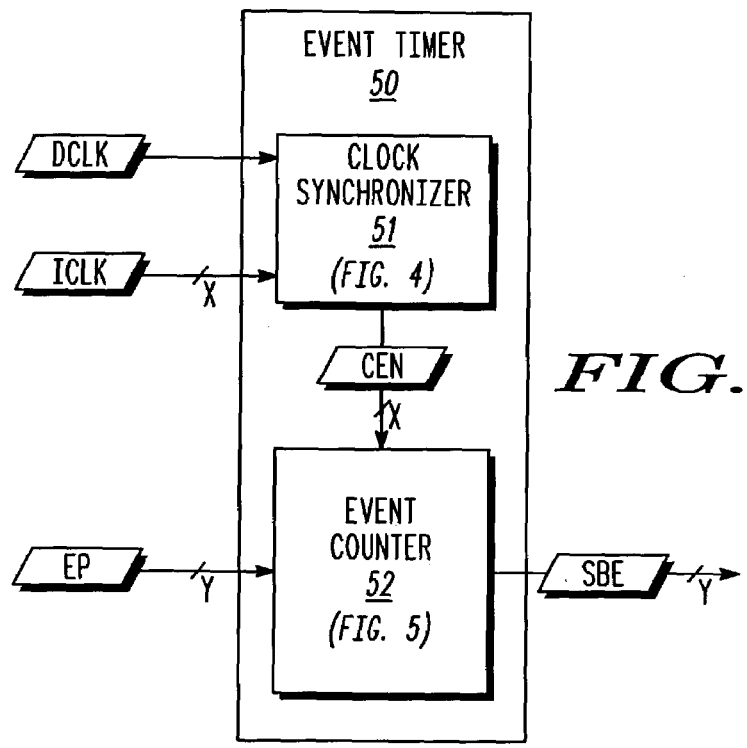
FIG. 3 illustrates one embodiment of an event timer in accordance with the present invention.

FIG. 3 illustrates an event timer 50 as one embodiment of the event timer 41 (FIG. 2). The event timer 50 employs a clock synchronizer 51 and an event counter 52. In operation, the clock synchronizer 51 receives the DSP clock signal DCLK and the X number of input clock signal(s) ICLK to thereby synchronize the input clock signal(s) ICLK to the DSP clock signal DCLK. The clock synchronizer 51 communicates X number of count enable signal(s) CEN with each count enable signal CEN being representative of a synchronization of a corresponding input clock signal ICLK to the DSP clock signal DCLK. The event counter 52 utilizes the count enable signal(s) CEN to generate the synchronous based event signal(s) SBE based on Y number of event period signal(s) EP with each event period signal EP indicating an event period associated with a corresponding hardware or software based event. The source(s) of event period signal(s) EP are based on an operational environment of scheduler hardware module 40. In one embodiment, the source of event period signal(s) EP is register set 21 (FIG. 1) of DSP core 20.

Clock Synchronizer

Figure 4:
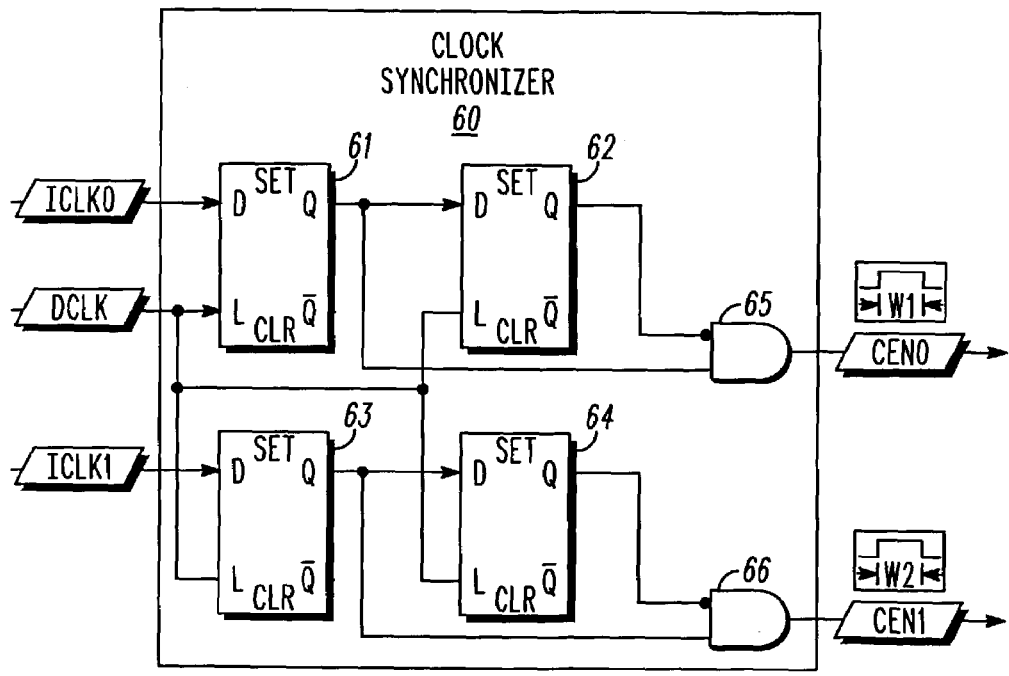
FIG. 4 illustrates one embodiment of a clock synchronizer in accordance with the present invention.

FIG. 4 illustrates a clock-synchronizer 60 as one embodiment of the clock synchronizer 51 (FIG. 3), where X=2. The clock synchronizer 60 employs four (4) latching devices in the form of flip-flops 61–64 and two (2) AND gates 65 and 66 for generating a pair of count enable signals CEN0 and CEN1. The count enable signals CEN0 and CEN1 represent a synchronization of input clock signals ICLK0 and ICLK1 with DSP clock signal DCLK, respectively, where the frequencies of the input clock signals ICLK0 and ICLK1 are dissimilar and slower than the frequency of the DSP clock signal DCLK (typically the frequency of DSP clock signal DCLK will be at least twice the frequency of the input clock signals ICLK0 and ICLK1). In operation, a D input of flip-flop 61 receives input clock signal ICLK0, a D input of flip-flop 63 receives input clock signal ICLK1, and L inputs of flip-flops 61–64 receive the DSP clock signal DCLK.

An output Q of flip-flop 61 is coupled to an input D of flip-flop 62 and a non-inverted input of AND gate 65, and an output Q of flip-flop 62 is coupled to an inverted input of AND gate 65 whereby, when the input clock signal ICLK0 transitions from a logic low level to a logic high level, the count enable signal CEN0 will pulse to a logic high level upon a rising edge of the DSP clock signal DCLK. A width W1 of the pulsed count enable signal CEN0 is equal to one cycle of DSP clock signal DCLK.

An output Q of flip-flop 63 is coupled to an input D of flip-flop 64 and a non-inverted input of AND gate 66, and an output Q of flip-flop 64 is coupled to an inverted input of AND gate 66 whereby, when the input clock signal ICLK1 transitions from a logic low level to a logic high level, the count enable signal CEN1 will pulse to a logic high level upon a rising edge of the DSP clock signal DCLK. A width W2 of the pulsed count enable signal CEN1 is equal to one cycle of DSP clock signal DCLK.

Event Counter

Figure 5:
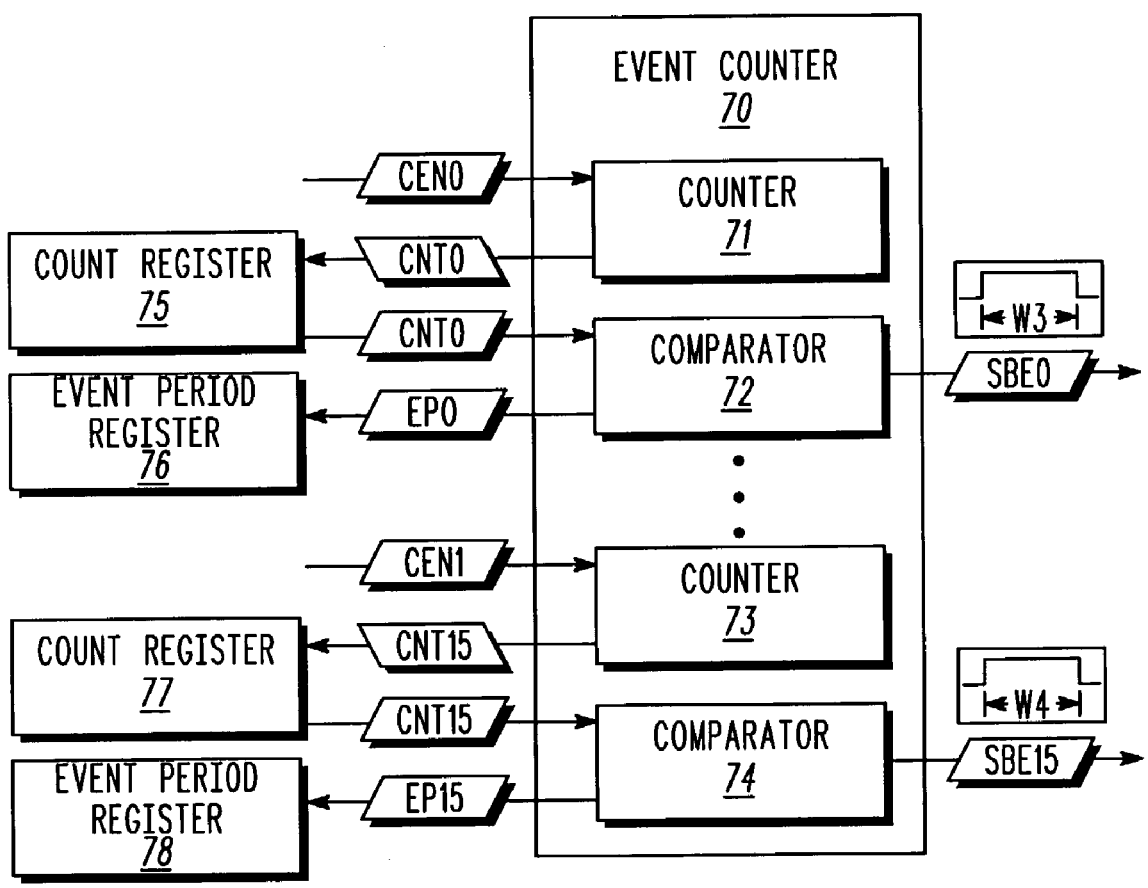
FIG. 5 illustrates one embodiment of an event counter in accordance with the present invention.

FIG. 5 illustrates an event counter 70 as one embodiment of the event counter 52 (FIG. 3), where X=2 and Y=16. The event counter 70 employs a counter and a comparator for each event for a total of sixteen (16) counter-comparator pairings, of which a counter 71-comparator 72 pairing and a counter 73-comparator 74 pairing are illustrated. In operation, the counter 71 receives count enable signal CEN0 from AND gate 65 (FIG. 4) whereby, when count enable signal CEN0 is a logic high, counter 71 is operated to increment its count in accordance with the DSP clock DCLK (FIG. 4). Counter 71 communicates a count signal CNT0 to a 16-bit count register 75 that resides in register set 21 (FIG. 1) whereby the count register 75 is indicative of the current count of counter 71. Count register 75 communicates count signal CNT0 to comparator 72, and a 16-bit event period register 76 that also resides in register set 21 communicates an event period signal EP0 to comparator 72. Event period signal EP0 indicates an event period associated with a particular synchronous based event assigned to event period register 76. Comparator 72 compares count signal CNT0 and event period signal EP0 to thereby generate a synchronous based event signal SBE0 that pulses to a logic high level whenever count signal CNT0 exceeds the event period signal EP0. The width W3 of the pulsed synchronous based event signal SBE0 is equal to one cycle of DSP clock signal DCLK. Counter 71 is reset upon the pulse of synchronous based event SBE0, and the process is repeated.

Similarly, counter 73 receives count enable signal CEN1 from AND gate 66 (FIG. 4) whereby, when count enable signal CEN1 is a logic high, counter 73 is operated to increment its count in accordance with the DSP clock DCLK. Counter 73 communicates a count signal CNT15 to a 16-bit count register 77 that resides in register set 21 whereby the count register 77 is indicative of the current count of counter 73. Count register 77 communicates count signal CNT15 to comparator 74, and a 16-bit event period register 78 that also resides in register set 21 communicates an event period signal EP15 to comparator 74. Event period signal EP15 indicates an event period associated with a particular synchronous based event assigned to event period register 78. Comparator 74 compares count signal CNT15 and event period signal EP15 to thereby generate a synchronous based event signal SBE15 that pulses to a logic high level whenever count signal CNT15 exceeds the event period signal EP15. The width W4 of the pulsed synchronous based event signal SBE15 is equal to one cycle of DSP clock signal DCLK. Counter 73 is reset upon the pulse of synchronous based event SBE15, and the process is repeated.

The counter-comparator pairings for generating synchronous based event signal SBE1–SBE14 (not shown) operate in response to count enable signal CEN0 or count enable signal CEN1 in the same manner as described herein for the illustrated counter-comparator pairings. Each event period register associated with a counter-comparator pairing can be re-programmed via DSP core 20 to indicate a different event period for the assigned synchronous based event or to indicate an event period associated with a newly assigned synchronous based event.

Event Controller

Figure 6:
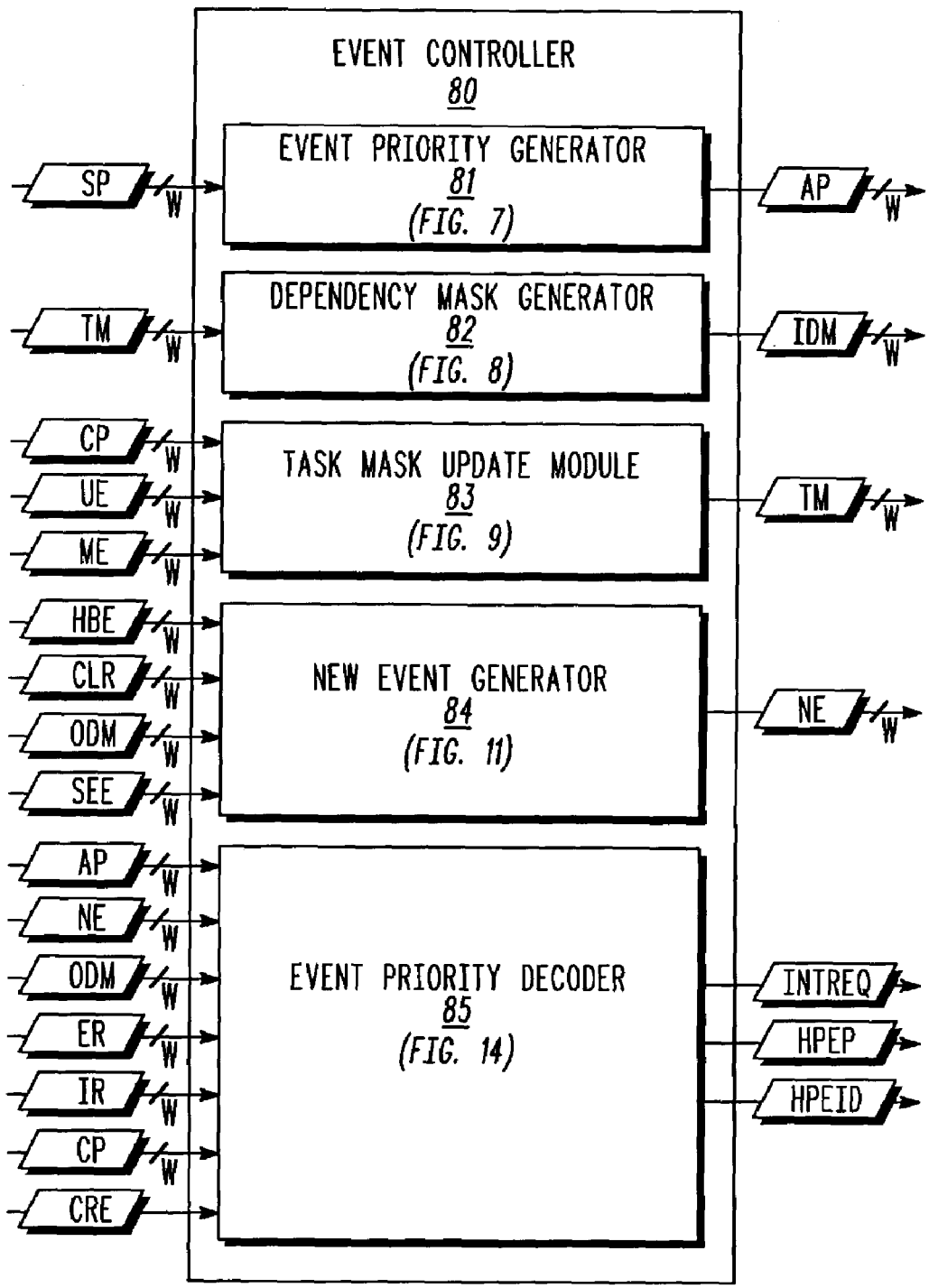
FIG. 6 illustrates one embodiment of an event controller in accordance with the present invention.

FIG. 6 illustrates an event controller 80 as one embodiment of the event controller 43 (FIG. 2). The event controller 80 employs an event priority generator 81, a dependency mask generator 82, a task mask update module 83, a new event generator 84, and an event priority decoder 85 for generating the interrupt request signal INTREQ, the highest priority runnable event signal HPRE (FIGS. 1 and 2) in the form of a highest priority runnable event identification signal HPEID and a highest priority runnable event position signal HPEP. In one embodiment, the event controller 80 operates in accordance with the DSP clock signal DCLK (FIG. 2).

The event priority generator 81 receives W number of static priority signals SP with each static priority signal SP being indicative of a DSP core 20 defined priority for a corresponding hardware or software based event. Based on the static priority signals SP, the event priority generator 81 generates W number of actual priority signals AP. Each actual priority signal AP is identical to a corresponding static priority signal SP or indicative of a dynamic priority for the corresponding hardware or software based event.

The dependency mask generator 82 receives W number of task mask signals TM, each being indicative of a current dependency masking status of a corresponding hardware or software based event by each one of the events. Based on the task mask signals TM, the dependency mask generator 82 generates W number of input dependency mask signals IDM, each input dependency mask signal IDM being indicative of a current masking status of a corresponding hardware or software based event. The current dependency masking status is either "masked" by at least one event or "unmasked" by all events.

The task mask update module 83 receives W number of current event position signals CP, W number of unmasked events signals UE, and W number of masked events signals ME. The current event position signals CP are collectively indicative of which event of the W number of events, if any, is currently being executed by DSP core 20 (FIG. 1). The unmasked events signals UE are collectively indicative of which W number of events are either to maintain an "unmasked" status or to transition from a "masked" status to an "unmasked" status. The masked events signals ME are collectively indicative of which W number of events that are either to maintain a "masked" status or to transition from an "unmasked" status to a "masked" status. Based on these signals, the task mask update module 83 generates the W number of task mask signals TM for the dependency mask generator 82.

The new event generator 84 receives up to W number of hardware based event signals HBE as communicated to new event generator 84 by MUX 42 (FIG. 2), the W number of input dependency mask signals IDM as generated by dependency mask generator 82, and W number of output dependency mask signals ODM, each output dependency mask signal ODM being based on a corresponding input dependency mask signal IDM as will subsequently described herein. The new event generator 84 further receives a W number of clear event signals CLR, each clear event signal CLR being indicative of whether a corresponding hardware or software based event should be cleared, and a W number of software based event enable events SEE, each software based event enable signal SEE being indicative of whether a corresponding event is a software based event or not. Based on these received signals, the new event generator 84 generates W number of new event signals NE, each indicative of a readiness status of a corresponding hardware or software based event.

The event priority decoder 85 receives the W number of actual priority signals AP from event priority generator 81, and the W number of new event signals NE from new event generator 84. The event priority decoder 85 further receives the W number of output dependency mask signals ODM, W number of event to resume signals ER, a W number of interruption mask signals IR, W number current event position signals CP, and a current runnable event signal CRE. Based on all of the received signals, the event priority decoder 85 generates the interrupt request signal INTREQ, the highest priority runnable event identification signal HPEID, and the highest priority runnable event position signal HPEP.

In a first alternative embodiment of event controller 80, the new event generator 84 does not receive the hardware based event signal(s) HBE when the event controller 80 is being operated to exclusively process software based events.

In a second alternative embodiment of event controller 80, the new event generator 84 does not receive the software based event enable signal(s) SSE when the event controller 80) is being operated to exclusively process hardware based event signal(s) HBE.

Event Priority Generator

Figure 7:
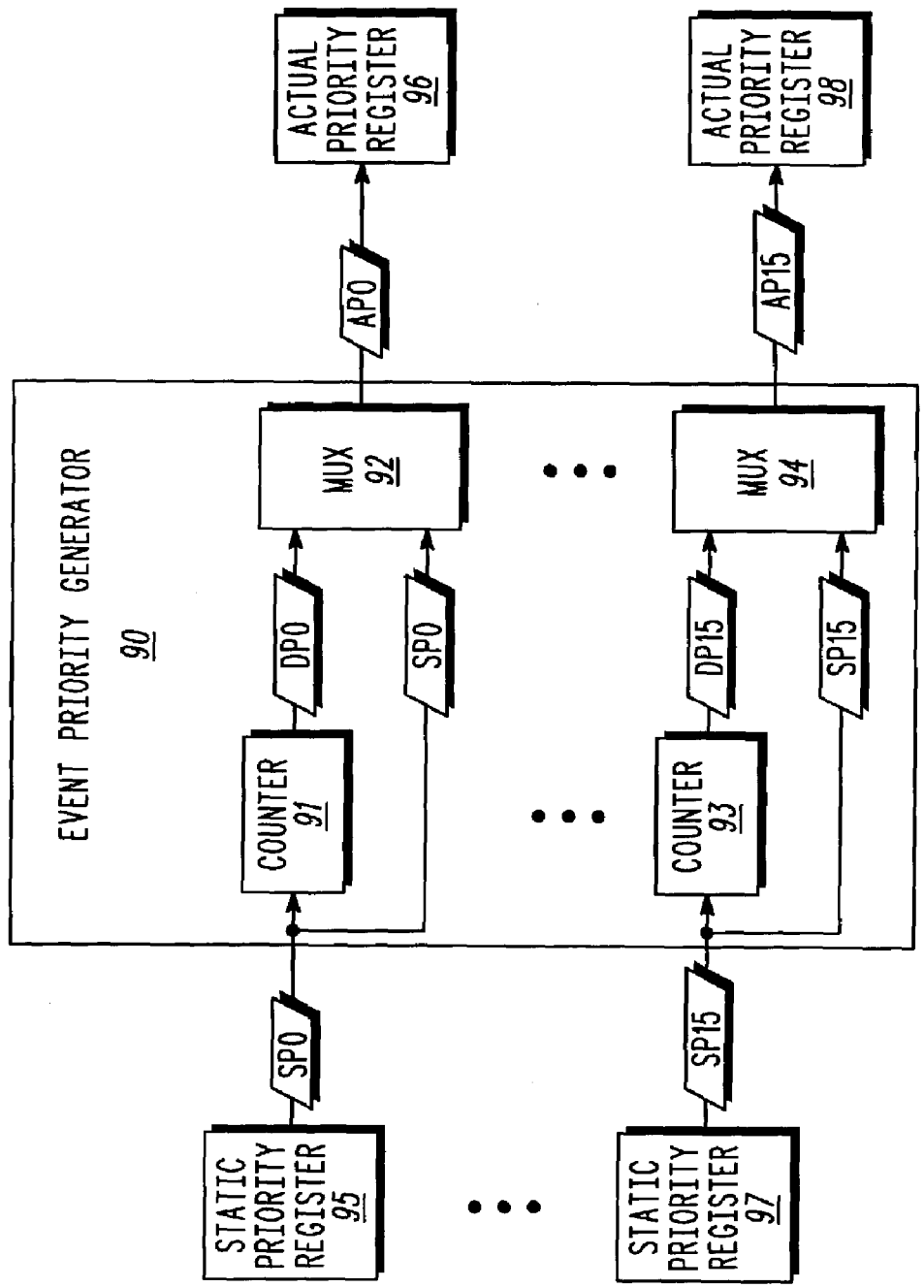
FIG. 7 illustrates one embodiment of an event priority generator in accordance with the present invention.

FIG. 7 illustrates an event priority generator 90 as one embodiment of the event priority generator 81 (FIG. 6), where W=X=Z=16. The event priority generator 90 employs a counter and a multiplexor pairing for each event for a total of sixteen (16) counter-MUX pairings, of which a counter 91-MUX 92 pairing and a counter 93-MUX 94 pairing are illustrated. In operation, counter 91 and MUX 92 receive a 16-bit static priority signal SP0 from a static priority register 95 residing in register set 21 (FIG. 1), and MUX 92 provides a 16-bit actual priority signal AP0 to an actual priority register 96 residing in register set 21. When enabled by DSP core 20 (FIG. 1), counter 91 increments/decrements the static priority signal SP0 to thereby generate a 16-bit dynamic priority signal DP0 for a corresponding event. As directed by DSP core 20 (FIG. 1), MUX 92 provides actual priority signal AP0 as either the static priority signal SP0 or the dynamic priority signal DP0.

Similarly, counter 93 and MUX 94 receive a 16-bit static priority signal SP15 from a static priority register 97 residing in register set 21, and MUX 94 provides a 16-bit actual priority signal AP15 to an actual priority register 98 residing in register set 21. When enabled by DSP core 20 (FIG. 1), counter 93 increments/decrements the static priority signal SP15 to thereby generate a 16-bit dynamic priority signal DP15 for a corresponding event. As directed by DSP core 20 (FIG. 1), MUX 94 provides actual priority signal AP15 as either the static priority signal SP15 or the dynamic priority signal DP15.

The counter-MUX pairings for generating actual priority signals AP1–AP14 (not shown) operate in the same manner as described herein for the illustrated counter-MUX pairings. Each static priority register associated with a counter-MUX pairing can be re-programmed via DSP core 20 to indicate a static priority for the assigned event.

Dependency Mask Generator

Figure 8:
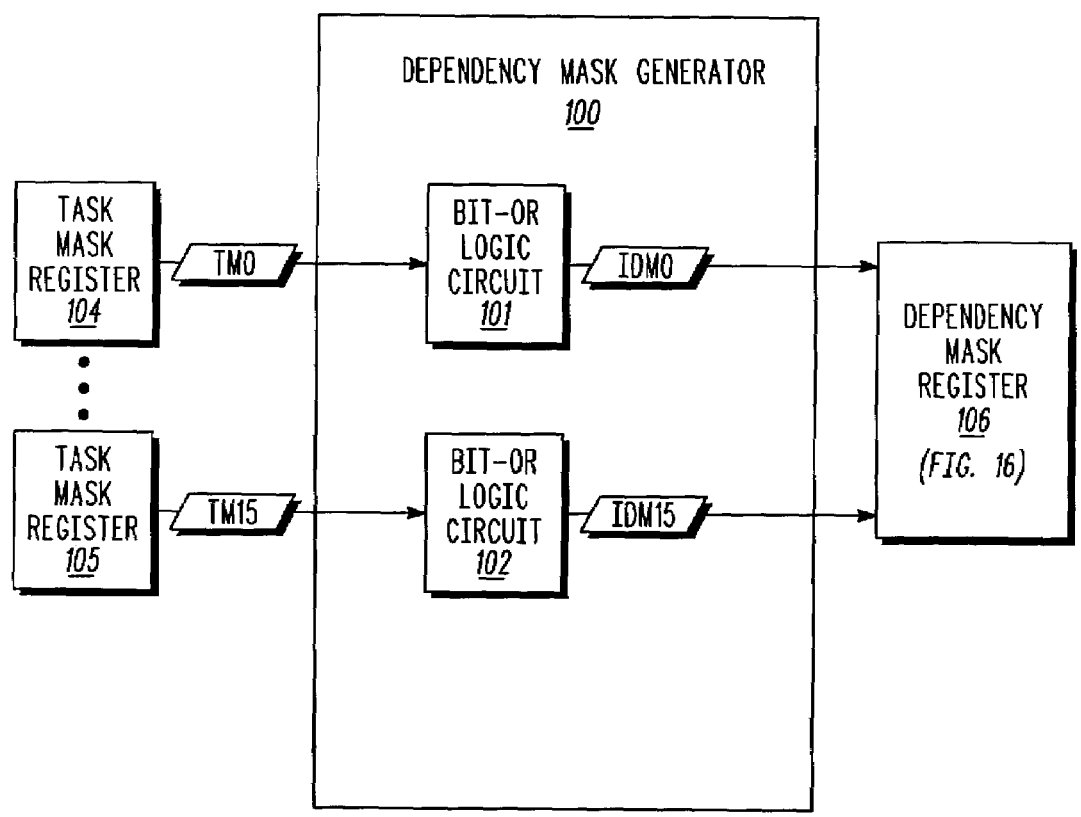
FIG. 8 illustrates one embodiment of a dependency mask generator in accordance with the present invention.

FIG. 8 illustrates a dependency mask generator 100 as one embodiment of the dependency mask generator 82 (FIG. 6), where W=X=Z=16. The dependency mask generator 100 employs sixteen (16) bit-OR logic circuits, of which a bit-OR logic circuit 101 and a bit-OR logic circuit 102 are illustrated. In operation, the bit-OR logic circuit 101 receives a 16-bit task mask signal TM0 from a task mask register 104 residing in register set 21 (FIG. 1). The bit-OR logic circuit 101 performs a logical OR operation involving all 16 bits of task mask signal TM0 whereby the result is a 1-bit input dependency mask signal IDM0.

Similarly, the bit-OR logic circuit 102 receives a 16-bit task mask signal TM15 from a task mask register 105 residing in register set 21. The bit-OR logic circuit 102 performs a logical OR operation involving all 16 bits of task mask signal TM15 whereby the result is a 1-bit input dependency mask signal IDM15.

The bit-OR logic circuits for generating input dependency mask signals IDM1–IDM14 (not shown) operate in the same manner as described herein for the illustrated bit-OR logic circuits.

Figure 16:
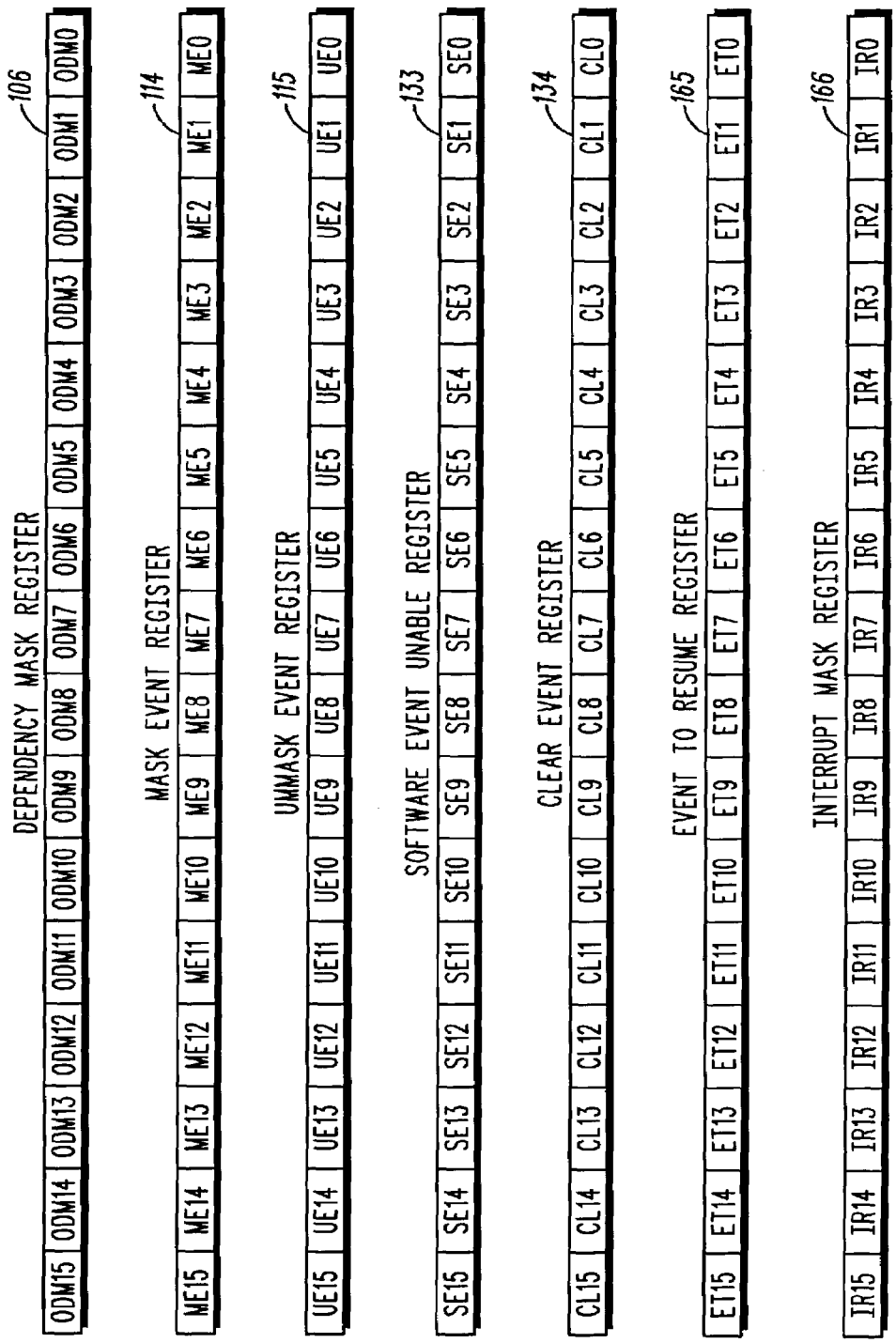
FIGS. 16 and 17 illustrates one embodiment of various registers in accordance with the present invention.

Each input dependency mask signal IDM0–IDM15 corresponds to one of the events and is selectively stored as one of a corresponding output dependency mask signal 0DM0–0DM15, respectively. An exemplary illustration of dependency mask register 106 is shown in FIG. 16.

Task Mask Update Module

Figure 9:
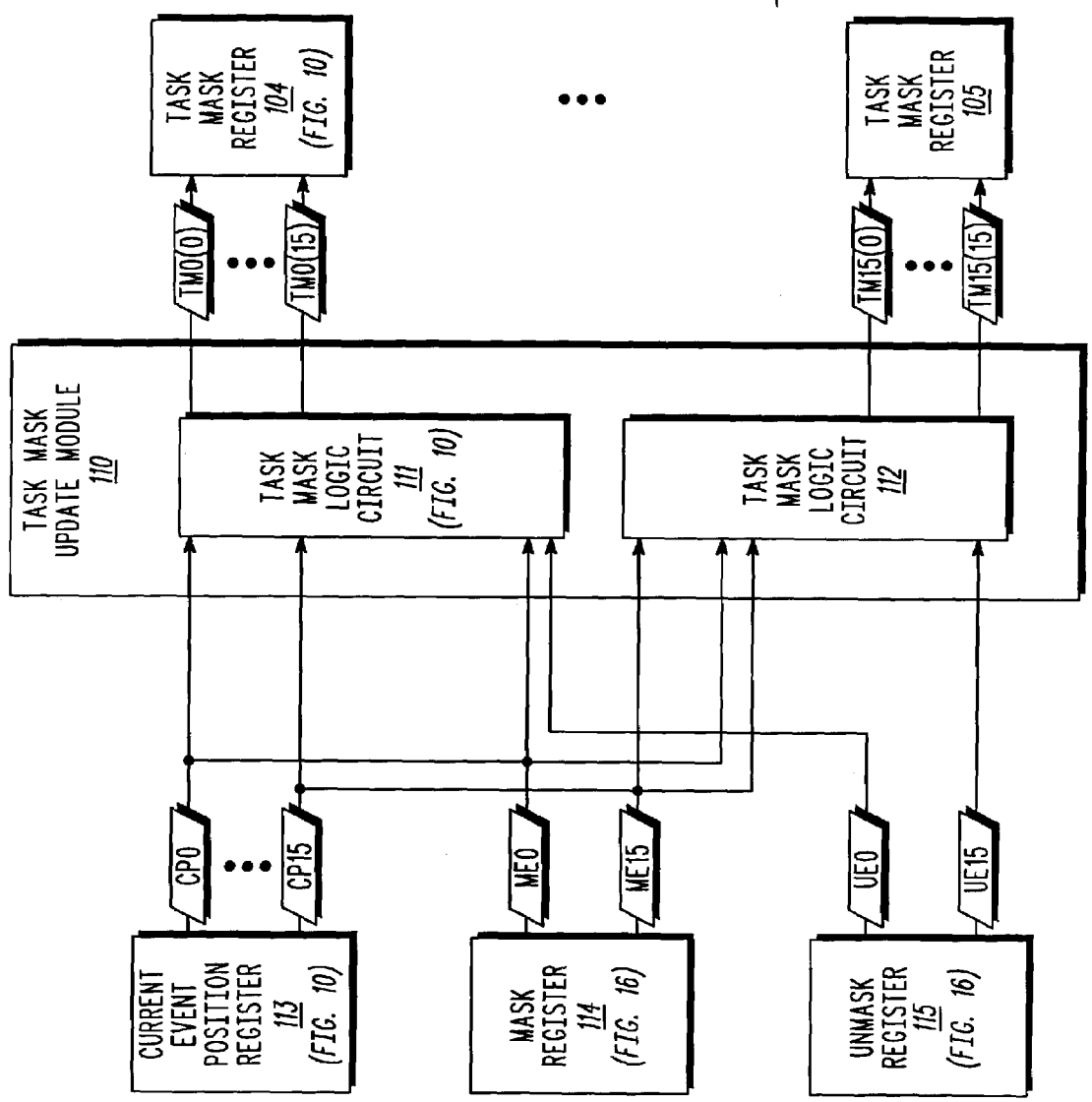
FIG. 9 illustrates one embodiment of a task mask update module in accordance with the present invention.

FIG. 9 illustrates a task mask update module 110 as one embodiment of the task mask update module 83 (FIG. 6), where W=X=Z=16. The task mask update module 110 employs sixteen (16) task mask logic circuits, of which a task mask logic circuit 111 and a logic circuit 112 are illustrated. In operation, task mask logic circuit 111 receives sixteen (16) 1-bit current event position signals from a current event position register 113, of which current event position signals CP0 and CP15 are illustrated. Task mask logic circuit 111 further receives a 1-bit mask event signal ME0 from a mask register 114, and a 1-bit unmask event signal UE0 from an unmask register 115. Registers 113-115 reside in register set 21 (FIG. 1). The logic circuit 111 performs one or more logic operations on the received signals to communicate sixteen (16) 1-bit task mask signals TM0 to appropriate bit locations of task mask register 104, of which task mask signal TM0(0) and task mask signal TM0(15) are illustrated.

Similarly, task mask logic circuit 112 receives the sixteen (16) 1-bit current event position signals from current event position register 113, a 1-bit mask event signal ME15 from a mask register 114, and a 1-bit unmask event signal UE15 from an unmask register 115. Task mask logic circuit 112 performs one or more logic operations on the received signals to communicate sixteen (16) 1-bit task mask signals TM15 to appropriate bit locations of task mask register 105, of which task mask signal TM15(0) and task mask signal TM15(15) are illustrated.

The task mask logic circuits for generating task mask signals TM1(0)–TM14(15) (not shown) in the same manner as described herein for the illustrated task mask logic circuits.

As previously described herein, each bit of dependency mask register 106 (FIG. 16) is associated with one of the sixteen (16) events. Furthermore, each of the sixteen (16) events is associated with a separate 16-bit task mask register (e.g., task mask registers 104 and 105). A ready event is masked when its bit in the dependency mask register 106 is set to "1". This occurs when an event is waiting for the result of one or more events to become available, or when an event is waiting for a resource locked by one or more semaphores. The sixteen (16) task mask registers keep track of the set of events that are masking the sixteen (16) events, respectively. At initialization, the sixteen (16) task mask registers reflect the precedence relationship each event has with all sixteen (16) events. They are updated in parallel whenever mask register 114 and unmask register 115 are updated by DSP core 20. Thus, when each bit of a task mask register goes to "0", it indicates that the corresponding hardware or software based event is not waiting anymore for any event or semaphore in order to run. This resets the corresponding bit in dependency mask register 106.

Task mask module 110 is utilized to handle semaphores and timing precedence.

In one embodiment, a semaphore has a semaphore register (not shown) indicating which events may use the semaphore. Before utilizing a resource protected by a semaphore, the semaphore register is loaded in the mask register 114 by DSP core 20. This blocks all the events, but the current event, that may ask to use the same resource. Before leaving a semaphore, the semaphore register is loaded in the unmask register 115 by DSP core 20. This unlocks all the events that have been waiting for the resource to be free. This mechanism is a simple implementation of the priority inheritance algorithm called the Priority Ceiling. The difference here is that the priority of the events holding the semaphore doesn't explicitly inherit the priority of the highest priority event that may hold the semaphore (i.e., the priority of the current event holding the semaphore doesn't change per say). Instead, the high priority event and all the other events that may share the same resource are prevented from running. This is equivalent to making them inherit the low priority of the event holding the semaphore until the semaphore is released. This has the advantage of minimizing the number of preemptions that would be required in the traditional Priority Ceiling algorithm. A second advantage is that no explicit change in the priority figure is needed.

In the same embodiment, the case of timing precedence between events (e.g., message passing or event waiting for another one to finish before it can start) is handled by the same masking and unmasking mechanism. After an event is executed, the mask register 114 and the unmask register 115 are updated by DSP core 20. The mask register 114 and the unmask register 115 can be updated while an event is running as well.

Task Mask Logic Circuit

Figure 10:
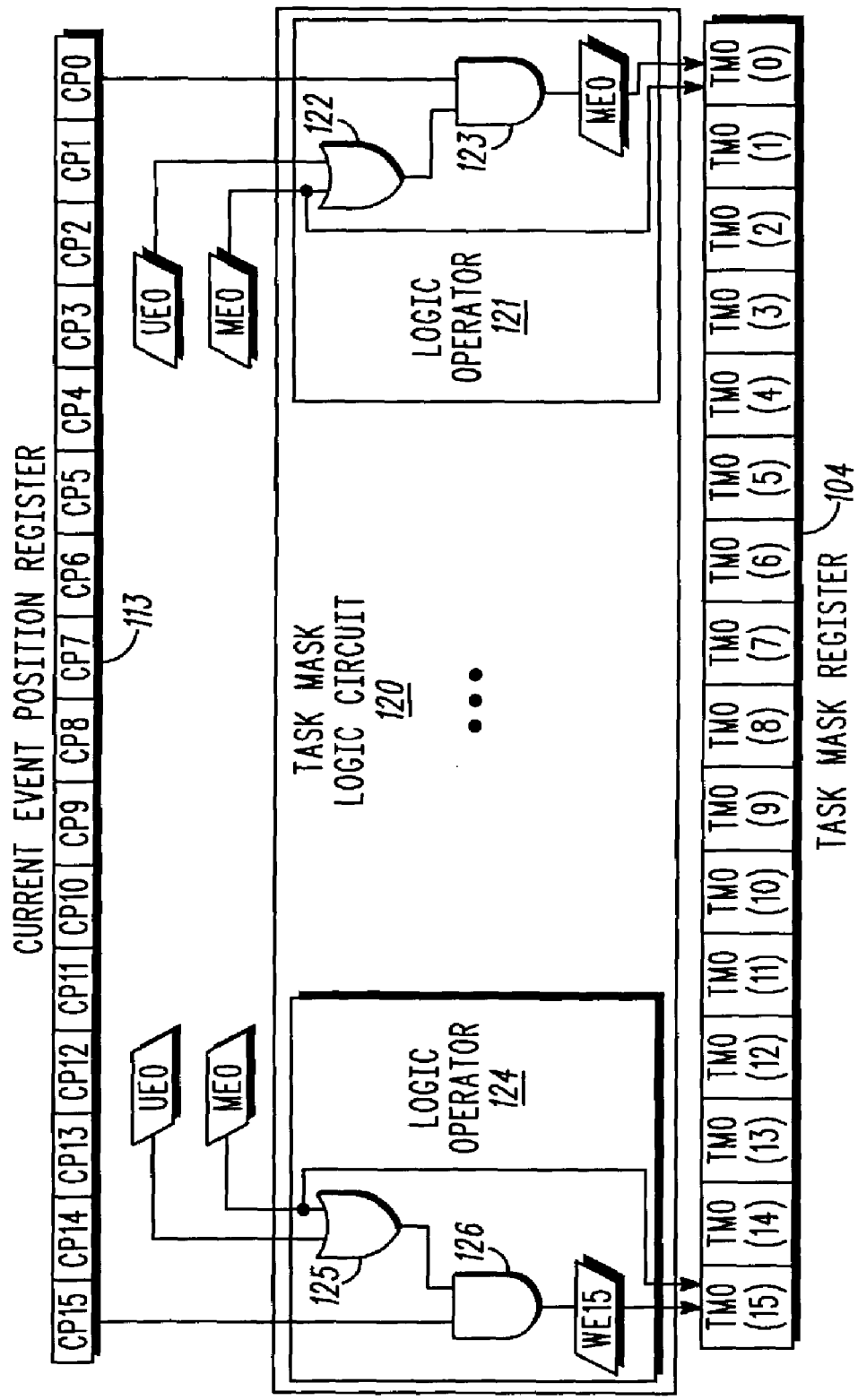
FIG. 10 illustrates one embodiment of a task mask logic circuit in accordance with the present invention.

FIG. 10 illustrates a task mask logic circuit 120 as one embodiment of the task mask update module 111 (FIG. 9), where W=X=Z=16. The task mask logic circuit 120 employs sixteen (16) logic operators, of which a logic operator 121 and a logic operator 124 are illustrated. In operation, logic operator 121 employs an OR gate 122 receiving a 1-bit mask event signal ME0 from mask register 114 (exemplary illustrated in FIG. 16) and a 1-bit unmask event signal UE0 from unmask register 115 (exemplary illustrated in FIG. 16). The result of the OR gate 122 is fed to an AND gate 123, which also receives a 1-bit current event position signal CP0 from current event position register 113. The result of the AND gate 123 is a write enable signal WE0. The logic level of the write enable signal WE0 determines whether logic operator 121 writes the mask event signal ME0 into task mask register 104 as task mask signal TM0(0).

Similarly, logic operator 124 employs an OR gate 125 receiving a 1-bit mask event signal ME0 from mask register 114 and a 1-bit unmask event signal UE0 from unmask register 115. The result of the OR gate 125 is fed to an AND gate 126, which also receives a 1-bit current event position signal CP15 from current event position register 113. The result of the AND gate 126 is a write enable signal WE15. The logic level of the write enable signal WE15 determines whether logic operator 124 writes the mask event signal ME15 into task mask register 104 as task mask signal TM0(15).

The logic operators of task mask logic circuit 120 (not shown) for generating task mask signals TM0(1)–TM0(14) operate in the same manner as described herein for the illustrated logic operators. Furthermore, each task mask logic circuit of task mask update module 110 (FIG. 9) operates in the same manner described herein for task mask logic circuit 120 as related to a corresponding task mask register.

New Event Generator

Figure 11:
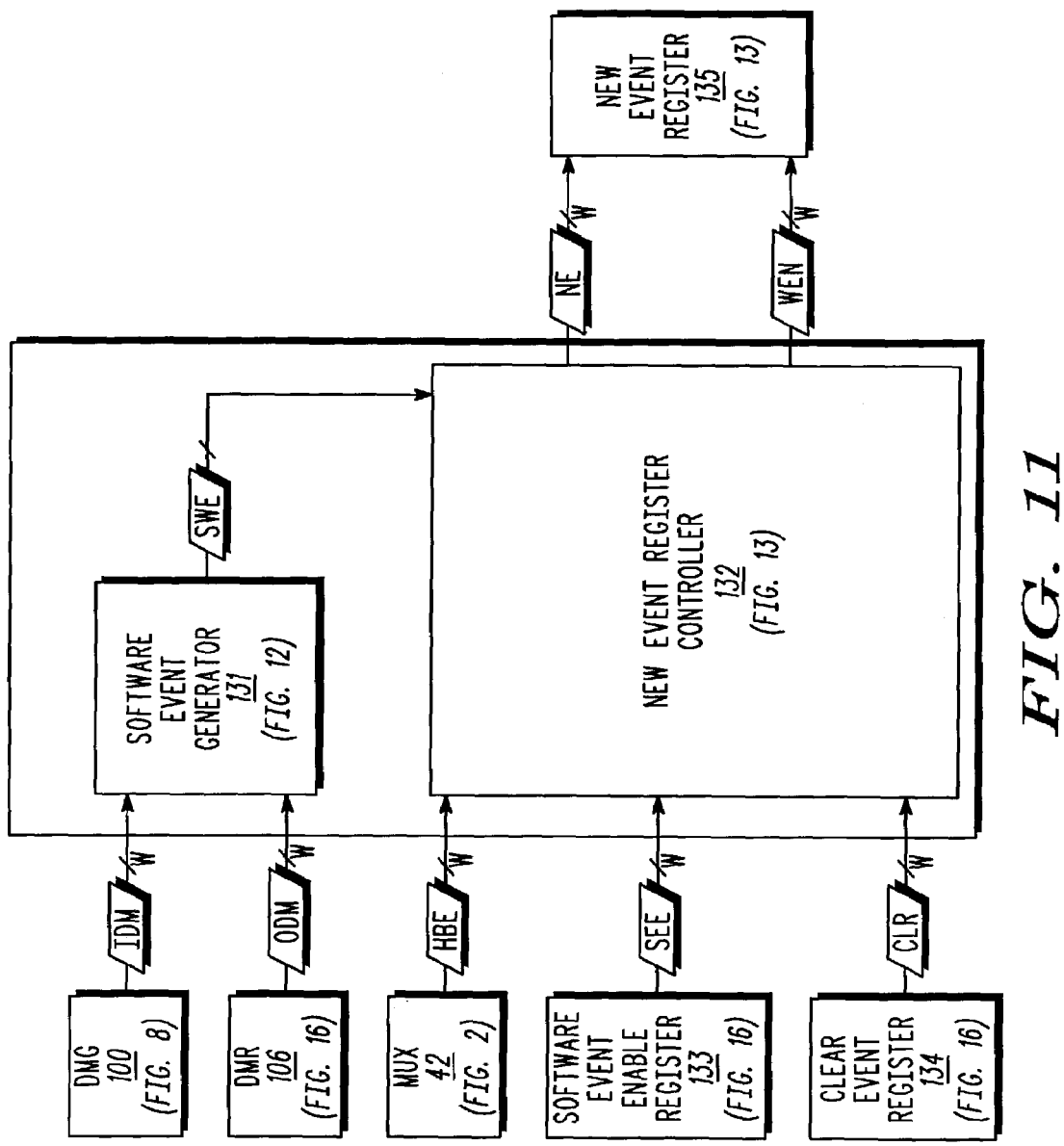
FIG. 11 illustrates one embodiment of a new event generator in accordance with the present invention.

FIG. 11 illustrates a new event generator 130 as one embodiment of the new event generator 84 (FIG. 6), where W 1. The new event generator 130 employs a software based event generator 131 and a new event register controller 132. In operation, software based event generator 131 receives W number of input dependency mask signals IDM from dependency mask generator 100 (FIG. 8) and W number of output dependency mask'signals ODM from dependency mask register 106 (FIG. 16). At any given period of time, an output dependency mask signal ODM as stored in dependency mask register 106 may or may not be identical to a corresponding input dependency mask signal IDM being generated by dependency mask generator 100. Based on any similarities and any dissimilarities between the two sets of dependency mask signals, software based event generator 131 communicates up to W number of software based events SWE to new event register controller 132.

Figure 18:
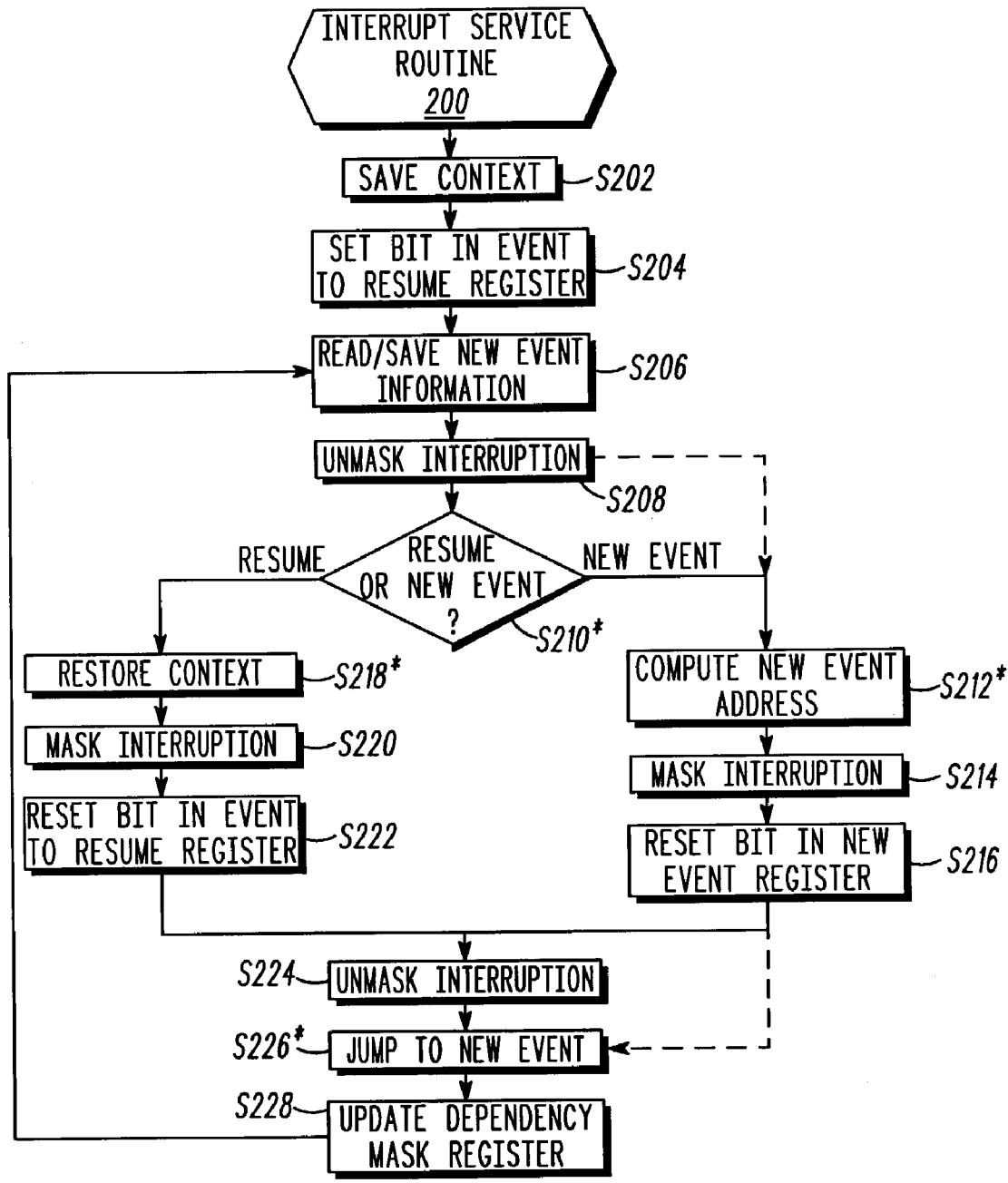
FIG. 18 illustrates one embodiment of an interrupt request routine in accordance with the present invention.

New event register 132 controller further receives up to W number of hardware based events HBE from MUX 42 (FIG. 2), W number of software based event enable signals SEE from a software based event enable register 133 that resides in register set 21 (FIG. 1), and W number of clear event signals CLR from a clear event register 134 that resides in register set 21. The software based event enable signals SEE are manipulated by DSP core 20 (FIG. 1) in accordance with a designed number of software based events. The clear event signals CLR are manipulated by DSP core 20 (FIG. 1) during an execution of an interrupt service routine 200 (FIG. 18) as represented by scheduler software module 31 (FIG. 1). Based on these received signals, new event generator register controller 132 communicates W number of new event signals NE and W number of write enable signals WEN to a new event register 135. Each new event signal NE is written into a corresponding bit location of new event register 135 in accordance with a corresponding write enable signal WEN. In one embodiment, a bit of new event register 135 that is set indicates an occurrence of a hardware based event or an unmasking of a masked software based event between two consecutive DSP clock cycles.

Software Based Event Generator

Figure 12:
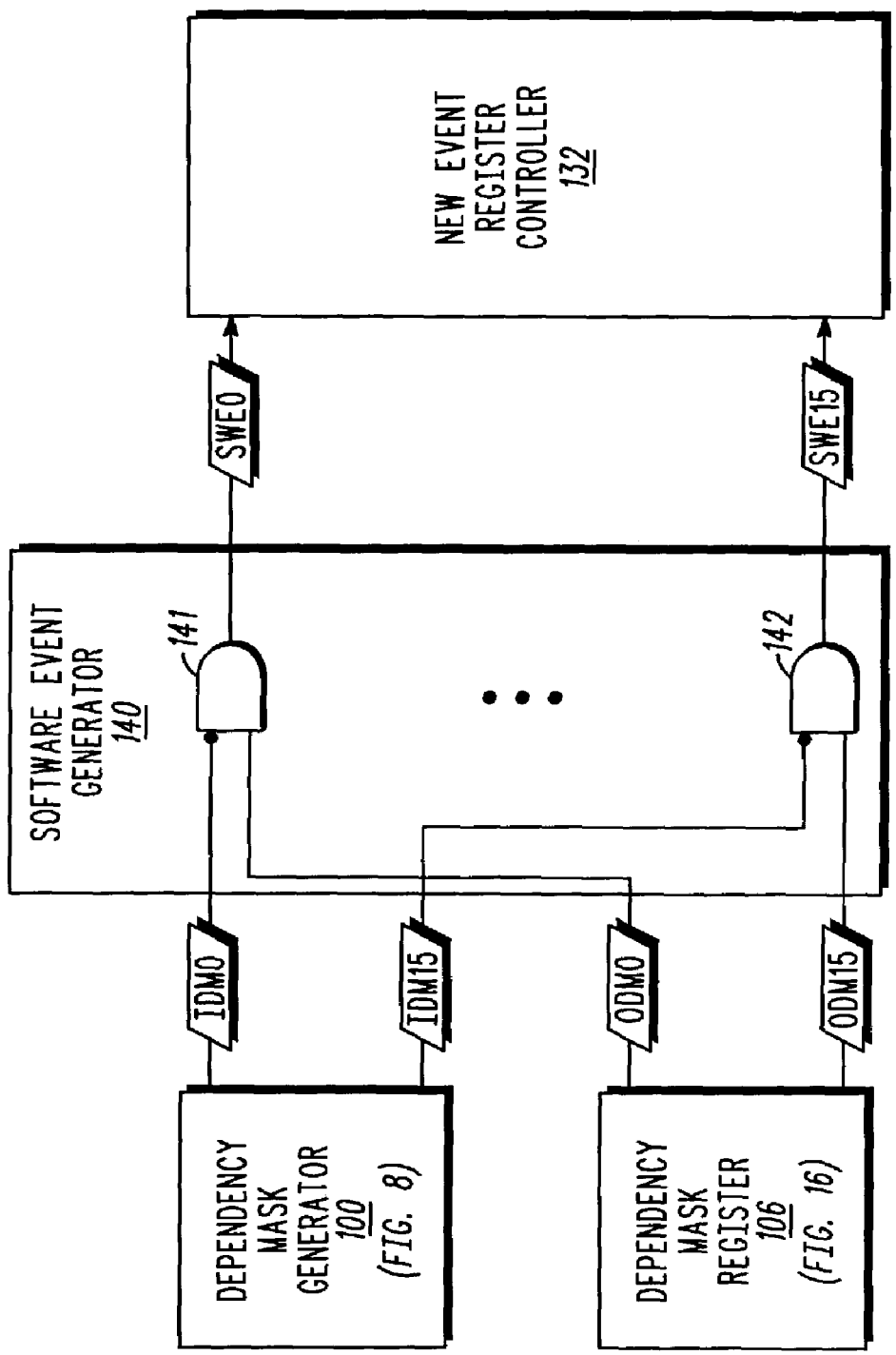
FIG. 12 illustrates one embodiment of a software event generator in accordance with the present invention.

FIG. 12 illustrates a software based event generator 140 as one embodiment of the software based event generator 131 (FIG. 11), where W=X=Z=16. The software based event generator 140 employs sixteen (16) AND gates, of which an AND gate 141 and an AND gate 142 are illustrated. In operation, an inverting input of AND gate 141 receives an input dependency mask signal IDM0 from dependency mask generator 100, and a non-inverting input of AND gate 141 receives an output dependency mask signal ODM0 from dependency mask register 106. In response thereto, AND gate 141 communicates a software based event SWE0 to new event register controller 132. Software based event SWE0 is indicative of any transition of a current masking status of a corresponding software based event from "masked" to "unmasked".

Similarly, an inverting input of AND gate 142 receives an input dependency mask signal IDM15 from dependency mask generator 100, and a non-inverting input of AND gate 142 receives an output dependency mask signal ODM15 from dependency mask register 106. In response thereto, AND gate 142 communicates a software based event SWE15 to new event register controller 132. Software based event SWE15 is indicative of any transition of a current masking status of a corresponding software based event from "masked" to "unmasked".

The AND gates of software based event generator 140 for generating software based event SWE1–SWE14 (not shown) operate in the same manner as described herein for the illustrated logic AND gates.

New Event Register Controller

Figure 13:
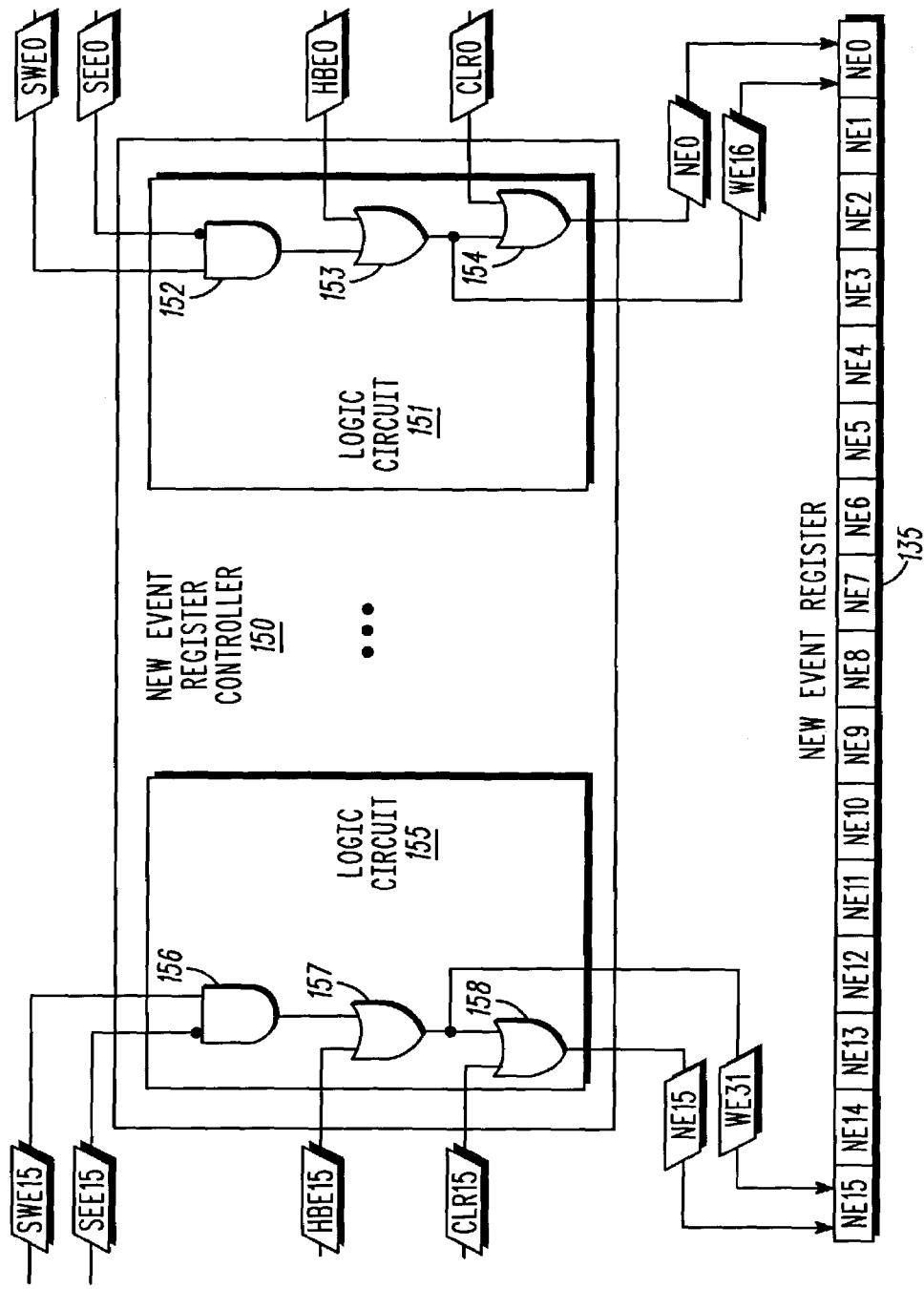
FIG. 13 illustrates one embodiment of a new event register controller in accordance with the present invention.

FIG. 13 illustrates a new event register controller 150 as one embodiment of the new event register controller 132 (FIG. 11), where W=X=Z=16. The new event register controller 150 employs sixteen (16) logic circuits, of which a logic circuit gate 151 and a logic circuit 155 are illustrated. Logic circuit 151 employs an AND gate 152, an OR gate 153, and an OR gate 154. Logic circuit 155 employs an AND gate 156, an OR gate 157, and an OR gate 158.

In operation, a non-inverting input of AND gate 152 receives a software based event signal SWE0 from software based event generator 140 (FIG. 12), and an inverting input of AND gate 152 receives a software based event enable signal SEE0 from software based event enable register 133 (exemplary illustrated in FIG. 16). In one embodiment, the software based event enable signal SEE0 is an active low whereby a resetting of software based eventenable signal SEE0 indicates an event corresponding to new event NE0 is a software based event. The result of AND gate 152 is communicated to OR gate 153, which also receives a hardware based event HBE0 from MUX 42 (FIG. 2). The result of OR gate 153 serves as write enable signal WE16 and is communicated to OR gate 154, which also receives a clear event signal CLR0 from clear event register 134 (exemplary illustrated in FIG. 16). The result of OR gate 154 is new event signal NE0, which is selectively written into the first bit location of new event bit register 135 in accordance with write enable signal WE16.

Similarly, a non-inverting input of AND gate 156 receives a software based event signal SWE15 from software based event generator 140, and an inverting input of AND gate 156 receives a software based event enable signal SEE15 from software based event enable register 133. In one embodiment, the software based event enable signal SEE15 is an active low whereby a resetting of software based event enable signal SEEI5 indicates an event corresponding to new event NE15 is a software based event. The result of AND gate 156 is communicated to OR gate 157, which also receives a hardware based event HBE15 from MUX 42. The result of OR gate 157 serves as write enable signal WE31 and is communicated to OR gate 158, which also receives a clear event signal CLR15 from clear event register 134. The result of OR gate 158 is new event signal NE15, which is selectively written into the sixteenth bit location bit of new bit register 135 in accordance with write enable signal WE31.

The logic circuits of new event register controller 150 for generating new event signals NE1–NE14 (not shown) and write enable signal WE31-WE30 (not shown) operate in the same manner as described herein for the illustrated logic circuits whereby each bit location of new event register 135 can be selectively set or reset.

Event Priority Decoder

Figure 14:
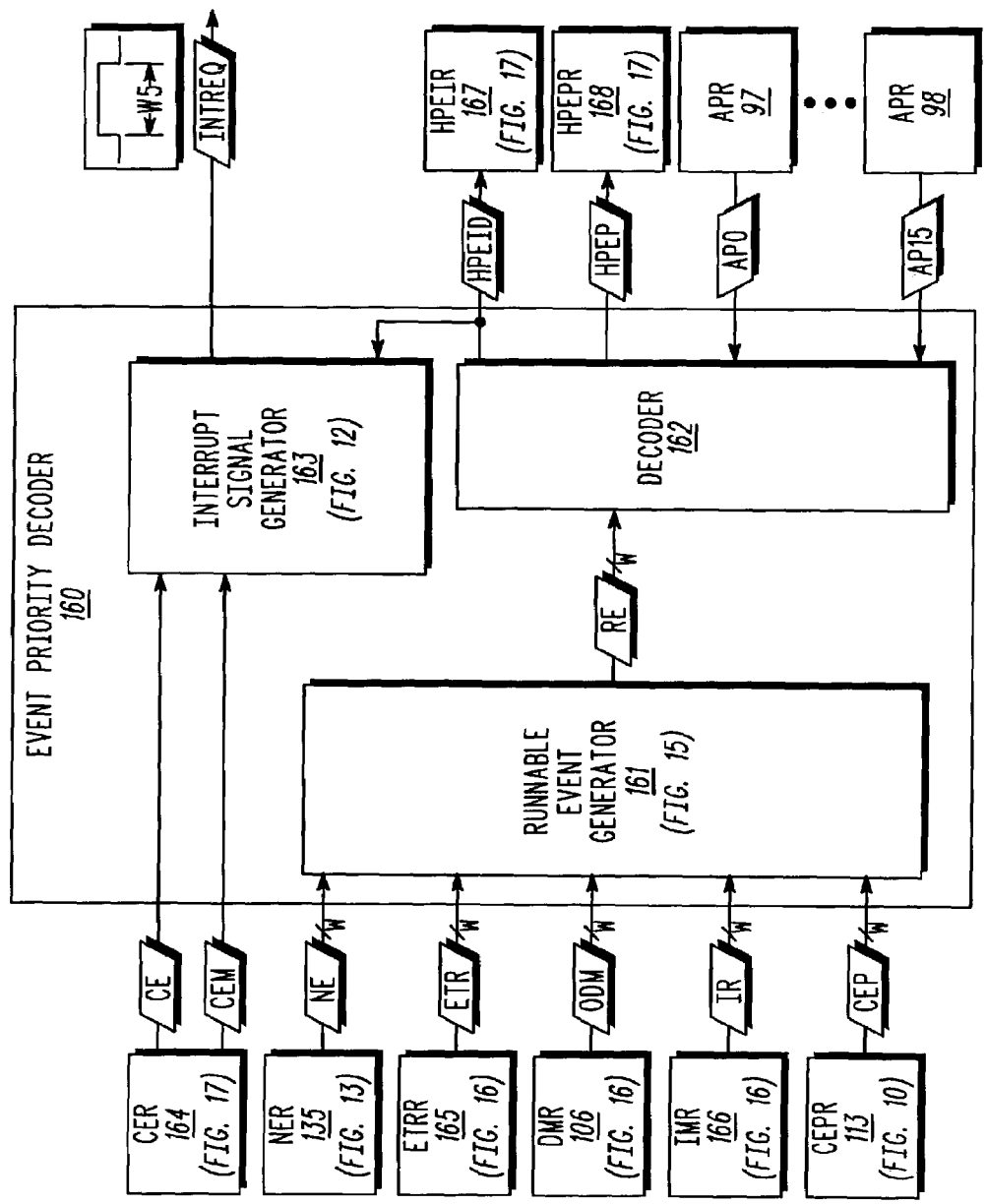
FIG. 14 illustrates one embodiment of an event priority decoder in accordance with the present invention.

FIG. 14 illustrates an event priority decoder 160 as one embodiment of the event priority decoder 85 (FIG. 6). The event priority decoder 160 employs a runnable event generator 161, a decoder 162, and an interrupt signal generator 163. In operation, runnable event generator 161 receives W number of new event signals NE from new event register 135, W numbers of event to resume signals ETR from an event to resume register 165 that resides in register set 21 (FIG. 1), W number of output dependency mask signals ODM from dependency mask register 106, W number of interruption mask signals IR from an interruption mask register 166 that resides in register set 21, and W number of current event position signals CEP from current event position register 113. Based on these received signals, runnable event generator 161 communicates W number of runnable event signals RE to decoder 162, each runnable event signal RE indicative of a runnable status of a corresponding hardware or software based event.

In one embodiment, the bits within the event to resume register 165 that are set indicates corresponding hardware or software events that were interrupted while being serviced by the DSP core 20. A bit of interrupt mask register 166 being set prevents a current event being serviced by the DSP core 20 from being interrupted by another event sharing an exclusion relationship with the current event. A bit of current event position register 113 being set indicates which hardware or software based event is currently being serviced by DSP core 20.

Decoder 162 further receives W number of 16-bit actual priority signals AP0–AP15 from the actual priority registers, of which actual priority register 97 and actual priority register 98 are illustrated. Based on the received signals, decoder 162 implements a "min" function that compares the value of each actual priority signal AP0–AP15 for the runnable event signals RE0–RE15. The comparison may include or exclude the current event being served, whose identification is indicated by one of the current event position signals CEP. From the comparison, decoder 162 communicates the highest priority event identification signal HPEID to interrupt signal generator 163 and a highest priority event identification register 167. Decoder 162 also communicates a highest priority event position signal HPEP to a highest priority event position register 168.

Interruption signal generator 163 further receives a current event signal CE and a current event mask signal CEM from a current event register 164 that resides in register set 21. Based on these signals, interrupt signal generator 163 generates the interrupt request signal INTREQ having a pulse width W5 equal to one cycle of the DSP clock.

Runnable Event Generator, Decoder, and Interrupt Signal Generator

Figure 15:
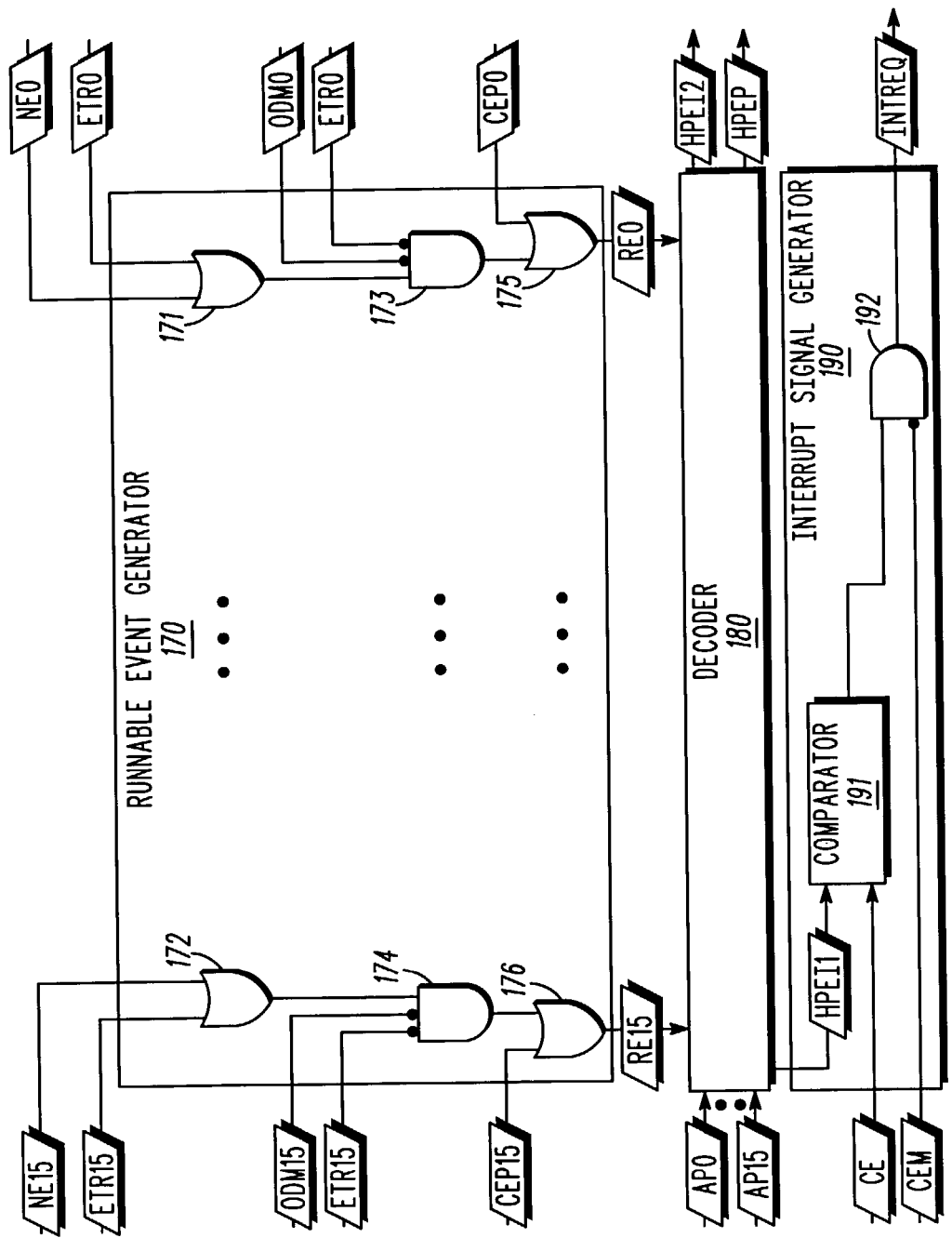
FIG. 15 illustrates one embodiment of an event priority logic circuit in accordance with the present invention.

FIG. 15 illustrates a runnable event generator 170 as one embodiment of the runnable event generator 161 (FIG. 14), a decoder 180 as one embodiment of the decoder 162 (FIG. 14), and an interrupt signal generator 190 as one embodiment of the interrupt signal generator 163 (FIG. 14), where W=X=Z=16. The runnable event generator 170 employs a first row of sixteen (16) OR gates, a row of sixteen (16) AND gates, and a second row of sixteen (16) OR gates, of which an OR gate 171, an OR gate 172, an AND gate 173, an AND gate 174, an OR gate 175, and an OR gate 176 are illustrated.

In operation, OR gate 171 receives a new event signal NE0 from new event register 135 (FIG. 13) and an event to resume signal ETR0 from event to resume register 165 (FIG. 16). The result of OR gate 171 is communicated to an non-inverting input of AND gate 173, which further receives an output dependency mask signal ODM0 from dependency mask register 106 (FIG. 16) and an interruption mask signal IR0 from interruption mask register 166 (FIG. 16) at a pair of inverting inputs. The result of AND gate 173 is communicated to OR gate 175, which further receives a current event position signal CEPO from current event position register 113 (FIG. 10). The result of OR gate 175 is a runnable event signal RE0 that is communicated to decoder 162.

Similarly, OR gate 172 receives a new event signal NE15 from new event register 135 and an event to resume signal ETR15 from event to resume register 165. The result of OR gate 172 is communicated to an non-inverting input of AND gate 174, which further receives an output dependency mask signal ODM15 from dependency mask register 106 and an interruption mask signal IR15 from interruption mask register 166 at a pair of inverting inputs. The result of AND gate 174 is communicated to OR gate 176, which further receives a current event position signal CEP15 from current event position-register 113. The result of OR gate 176 is a runnable event signal RE15 that is communicated to decoder 162.

The OR gates and AND gates of runnable event generator 170 that are not illustrated operate in the same manner as described herein for the illustrated OR gates and AND gates whereby sixteen (16) runnable event signals RE0–RE15 are communicated to decoder 162.

Figure 17:
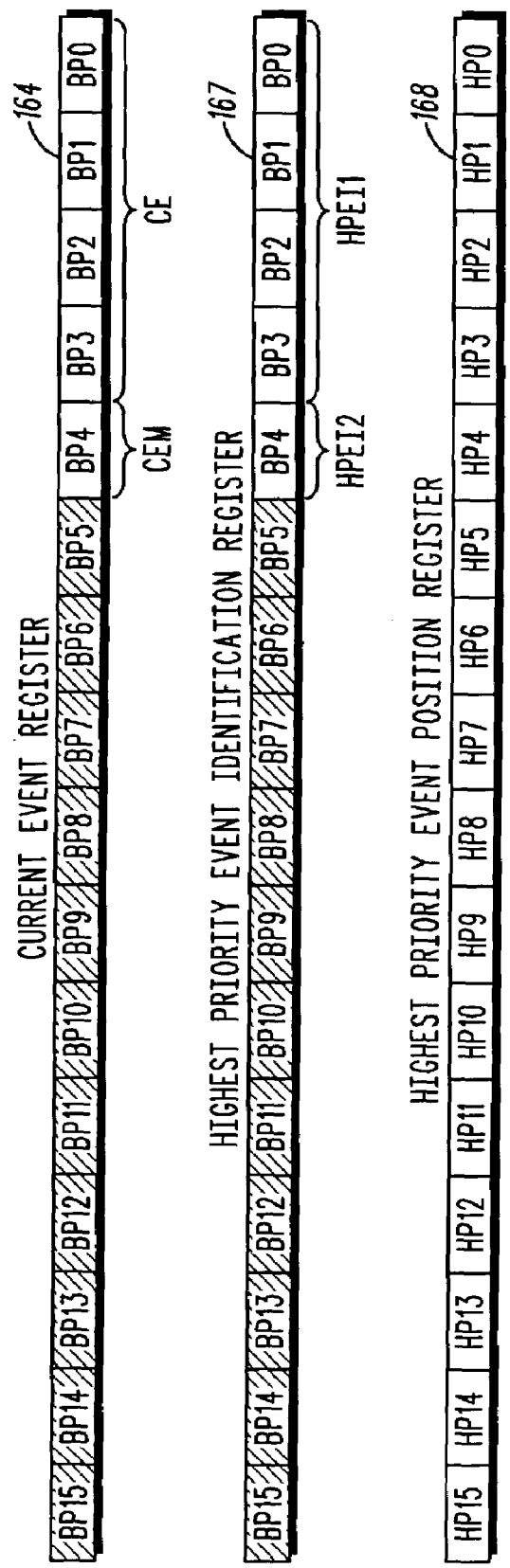

Decoder 180 includes conventional logic circuitry for implementing a "min" function that compares the value of each actual priority signal AP0–AP15 for the runnable event signals RE0–RE15. As previously state herein, the comparison may include or exclude the current event being served, whose identification is indicated by one of the current event position signals CEP. From the comparison, decoder 180 communicates identification bits HPEI1 (FIG. 17) of the highest priority event identification signal HPEID to both interrupt signal generator 190 and the last four bit locations of the highest priority event identification register 167, where the identification bits HPEI1 is a four bit identification of a runnable event having the highest priority.

Decoder 180 also communicates an identification bit HPEI2 (FIG. 17) of the highest priority event identification signal HPEID to a fifth bit location of the highest priority event identification register 167, where a setting of the identification bit HPEI2 indicates the runnable event identified by identification bits HPEI1 is a new event to be processed by DSP core 20 and a resetting of the identification bit HPEI2 indicates an interrupted event whose processing needs to be resumed by DSP core 20.

Decoder 180 further communicates the 16-bit highest priority event position signal HPEP to a highest priority event position register 168. Each bit of the highest priority event position signal HPEP corresponds to one of the events. Thus, only the bit corresponding to a runnable event having the highest priority as determined by decoder 180 is set within highest priority event position register 168.

Interrupt signal generator 190 employs a comparator 191 and an AND gate 192. The comparator 191 compares the identification bits HPEI1 (exemplary illustrated in FIG. 17) from decoder 180 and current event identity signal CE from current event register 164 (FIG. 17) as manipulated by DSP core 20. The result of the comparison is indicative of whether a change in the highest priority runnable event has occurred, and is communicated to a non-inverting input of AND gate 192, which also receives current event mask signal CEM from current event register 164. The current event mask signal CEM indicates whether the DSP core 20 allows interruption to occur at this time.

The result of AND gate 192 is a new pulse of the interrupt request signal INTREQ to indicate a change in the highest priority runnable event has occurred and a preceding pulse of interrupt request signal INTREQ is unmasked and the DSP core 20 is allowing an interruption of a currently serviced event. Conversely, the interrupt request signal INTREQ is not pulsed when either a change in the highest priority runnable event has not occurred and/or the DSP core 20 is not allowing an interruption of a currently serviced event.

Interrupt Service Routine

Referring to FIG. 1, upon receiving a new pulse of the interrupt request signal INTREQ from scheduler hardware module 30, DSP core 20 jumps to a fixed address of the DSP instruction memory 22 of an executable version of the scheduler software module 31 (i.e., computer readable code). The scheduler software module 31 implements an interrupt service routine ("ISR") 200 as represented by a flowchart illustrated in FIG. 18. ISR 200 is common for various scheduling algorithms, including, but not limited to static priority preemptive and non-preemptive, and dynamic priority preemptive Earliest Deadline First scheduling algorithms Referring to FIG. 18, prior to or concurrently with communicating the new pulse interrupt request signal INTREQ to DSP core 20, the event priority decoder 160 (FIG. 14) sets the current event mask signal CEM (FIG. 17) to "1" to thereby facilitate an execution by DSP core 20 of stage S202–S206 of ISR 200. During stage S202, DSP core 20 is instructed to store the information of the current event being serviced at the time of receiving the new pulse of interrupt request signal INTREQ. During stage S204, DSP core 20 is instructed to identify the current event being serviced at the time of receiving the new pulse of interrupt request signal INTREQ by setting a corresponding bit in the event to resume register 165 (FIG. 16). During stage S206, DSP core 20 is instructed to process new event information whereby the identification bits HPEI1 and HPEI2 stored within the higher runnable priority event identification register 167 (FIG. 17), and the bits stored within the highest priority event position register 168 (FIG. 17) are read and saved by DSP core 20. During a stage S208 of ISR 200, DSP core 20 is instructed to unmask the interruption by resetting the current event mask bit CEM of current event register 164 to "0".

If, during a stage S210 of ISR 200, DSP core 20 determines the new event is generated from the new event register 135 (FIG. 13) as indicated by a setting of "1" of the identification bit HPEI2, then DSP core 20 proceeds to a new event branch of ISR 200 that includes stages S212, S214 and S216. During stage S212, DSP core 20 is instructed to compute the address of the next task to service. Those having ordinary skill in the art will appreciate various conventional addressing schemes that can be implemented during stage S212. During stage S214, DSP core 20 is instructed to mask the interruption by setting the current event mask bit CEM of current event register 164 to "1". During stage S216, DSP core 20 is instructed to reset the corresponding bit in the new event register 135 to thereby acknowledge the new event to be serviced.

If, during stage S210, DSP core 20 determines the new event is generated from the event to resume register 165 as indicated by a resetting of "0" of the identification bit HPEI2, then DSP core 20 proceeds to a resume branch of ISR 200 that includes stages S218, S220 and S222. During stage S218, DSP core 20 is instructed to restore its data from the stack. During stage S220, DSP core 20 is instructed to mask the interruption by setting the current event mask bit CEM of current event register 164 to "1". During stage S222, DSP core 20 is instructed to reset the corresponding bit in the event to resume register 165 to thereby acknowledge a resuming of a servicing of the event.

Upon completion of either stage S216 or stage S222, the DSP core 20 in instructed to unmask the interruption during a stage S224 of ISR 200 by resetting the mask bit CEM of current event register 164 to "0", and to jump to the new event address during a stage S226 of the ISR 200. Stage S226 is completed upon a generation of a "return from interrupt" instruction (RTI). This masks the interruption. In response to the RTI, the DSP core 200 is instructed during a stage S228 of ISR 200 to update the dependency mask register 106 (FIG. 16). This is accomplished by loading the current task mask and unmask registers into the mask event register 114 (FIG. 16) and unmask event register 115 (FIG. 16), respectively. The sixteen (16) task mask registers are then updated as well as the dependency mask register 106. DSP core 20 is now ready to consider the next event to service via ISR 200.

Stages S210, S212, S218, and S226 are highlighted by an asterisk to indicate DSP core 20 can be interrupted during these stages while setting the new event via a new interrupt request signal INTREQ. In response thereto, DSP core 20 is instructed to drop the event and starts setting the "newer" event that exhibits a higher priority. This reduces the waiting time of high priority events that are pending in the event registers. This time may be very long in case of a big number of registers to restore with a non-preemptive interrupt service routine.

From the preceding description of ISR 200, those having ordinary skill in the art will appreciate that a blocking time and a switching time in servicing a new pulse of the interrupt request signal INTREQ is minimized by DSP core 20. In particular, the execution time for ISR 200 is independent of the event number as far as the number of events being serviced by DSP core 20 doesn't exceed the W number of events (e.g., 16). Consequently, the switching time is reduced to a constant under such circumstances.

A Fixed Priority Non-Preemptive Round-Robin

In this algorithm of ISR 200, the stages of ISR 200 are non-preemptive whereby an active path through ISR 200 consists of stages S206, S208, S212, S214, S216, S226 and S228 as indicated by the dashed arrows. The current event mask bit CEM of current event register 164 (FIG. 17) is set to "1" before jumping to the event address during stage S226. The interruption mask register 166 (FIG. 16) is reset at initialization and keeps its value afterwards. The actual priority registers (e.g., 96 and 98 illustrated in FIG. 7) are initialized with a corresponding static priority value, and the dynamic priority counters (e.g., 91 and 93 illustrated in FIG. 7) are disabled. The new event register 135 (FIG. 13), the highest priority event identification register 167 (FIG. 17), and the highest priority event position register 168 (FIG. 17) are updated real-time. The dependency mask register 106 (FIG. 16) and current event register 164 are also used. The ISR 200 is preemptive while computing the address of the new highest priority event.

A Fixed Priority Preemptive Rate Monotonic Algorithm

In this algorithm of ISR 200, the stages of ISR 200 are preemptive. The current event mask bit CEM of current event register 164 (FIG. 17) is set to "0" before jumping to the event address of stage S226. The dependency mask register 106 (FIG. 16) and interruption mask register 166 (FIG. 16) are reset at initialization. The actual priority registers (e.g., 96 and 98 illustrated in FIG. 7) are initialized with a corresponding static priority value, and the dynamic priority counters (e.g., 91 and 93 illustrated in FIG. 7) are disabled. The new event register 135 (FIG. 13), the highest priority event identification register 167 (FIG. 17), and the highest priority event position register 168 (FIG. 17) are updated real-time. The dependency mask register 106, the interruption mask register 166, and current event register 164 are also used. The ISR 200 is preemptive while computing the address of the new highest priority event or restoring the data of an event to resume.

A Dynamic Priority Preemptive Earliest Deadline First Algorithm

In this algorithm of ISR 200, the stages of ISR 200 are preemptive. The current event mask bit CEM of current event register 164 (FIG. 17) is set to "0" before jumping to the event address of stage S226. The dependency mask register 106 (FIG. 16) and interruption mask register 166 (FIG. 16) are reset at initialization. The actual priority registers (e.g., 96 and 98 illustrated in FIG. 7) are initialized with a corresponding static priority value, and the dynamic priority counters (e.g., 91 and 93 illustrated in FIG. 7) are enabled. The new event register 135 (FIG. 13), the highest priority event identification register 167 (FIG. 17), and the highest priority event position register 168 (FIG. 17) are updated real-time. The dependency mask register 106, the interruption mask register 166, and current event register 164 are also used. The ISR 200 is preemptive while computing the address of the new highest priority event or restoring the data of an event to resume.

A Mixed Algorithm for Dynamic and Fixed Priority, Preemptive and Non Preemptive Events In this algorithm of ISR 200, the stages of ISR 200 are preemptive. The current, event mask bit CEM of current event register 164 (FIG. 17) is either set to "1" before jumping to a non-preemptive event address, or reset to "0" before jumping to a preemptive event address. The dependency mask register 106 (FIG. 16) and interruption mask register 166 (FIG. 16) are reset at initialization. The actual priority registers (e.g., 96 and 98 illustrated in FIG. 7) are initialized with a corresponding static priority value, and the dynamic priority counters (e.g., 91 and 93 illustrated in FIG. 7) are enabled only for the events having dynamic priority. The new event register 135 (FIG. 13), the highest priority event identification register 167 (FIG. 17), and the highest priority event position register 168 (FIG. 17) are updated real-time. The dependency mask register 106, the interruption mask register 166, and current event register 164 are also used. The ISR 200 is preemptive while computing the address of the new highest priority event or restoring the data of an event to resume.

It is important to note that FIGS. 1–16 illustrate a specific application and embodiment of the present invention, and is not intended to limit the scope of the present disclosure or claims to that which is presented therein. Upon reading the specification and reviewing the drawings hereof, it will become immediately obvious to those skilled in the art that myriad other embodiments are possible, and that such embodiments are contemplated and fall within the scope of the presently claimed invention.

We claim:

1. A system, comprising:
   a digital signal processor;
   a scheduler hardware module operable to communicate a first interrupt request signal to said digital signal processor, the first interrupt request signal being indicative of any change in a highest priority runnable event among a plurality of events; and
   a scheduler software module executable to implement an interrupt request routine,
      wherein said digital signal processor executes said scheduler software module in response to the first interrupt request signal indicating a change in the highest priority runnable event among the plurality of events.

2. The system of claim 1, wherein said scheduler hardware module includes:
   an event timer operable to generate a synchronized based event.

3. The system of claim 2, wherein said event timer includes:
   a clock synchronizer operable to generate a count enable signal representative of a synchronization of a first clock signal external to said clock synchronizer to a second clock signal associated with said digital signal processor; and
   an event counter operable to generate the synchronized hardware based event in response to a reception of the count enable signal and an event period signal indicating an event period of the synchronized based event.

4. The system of claim 1, wherein said digital signal processor and said scheduler hardware module include:
   means for generating at least one synchronized based event.

5. The system of claim 1, wherein said scheduler hardware module includes:
   an event controller operable to receive at least one hardware based event signal.

6. The system of claim 5, wherein said digital signal processor is further operable to select which hardware based event signals within a plurality of hardware based event signals are to be received by said event controller.

7. The system of claim 1, wherein said scheduler hardware module includes:
   an event controller operable to detect the change in the highest priority runnable event among the plurality of events, said event controller further operable to generate a highest priority runnable event identification signal indicative of an identity of the highest priority runnable event.

8. The system of claim 7, wherein said event controller includes:
   an event priority generator operable to generate an actual priority signal selectively indicative of either a static priority or a dynamic priority of an event.

9. The system of claim 7, wherein said digital signal processor and said event controller include:
   means for generating an actual priority signal selectively indicative of either a static priority or a dynamic priority of an event.

10. The system of claim 7, wherein said event controller includes:
    a dependency mask generator operable to generate a dependency mask signal indicative of a dependency mask status of a first event.

11. The system of claim 10, wherein said event controller further includes:
    a task mask update module operable to generate a task mask signal indicative of whether the first event is awaiting a result of a second event.

12. The system of claim 10, wherein said event controller further includes:
    a task mask update module operable to generate a task mask signal indicative of whether the first event is awaiting a resource locked by at least one semaphore.

13. The system of claim 7, wherein said digital signal processor and said event controller include:
    means for generating a dependency mask signal indicative of a dependency mask status of a first event.

14. The system of claim 13, wherein said digital signal processor and said event controller further include:
    means for generating a task mask signal indicative of whether the first event is awaiting a result of a second event.

15. The system of claim 13, wherein said digital signal processor and said event controller further include:
    means for generating a task mask signal indicative of whether the first event is awaiting a resource locked by at least one semaphore.

16. The system of claim 7, wherein said event controller includes:
    a new event generator operable to generate a new event signal indicative of a readiness status of an event.

17. The system of claim 7, wherein said digital signal processor and said event controller include:
    means for generating a new event signal indicative of a readiness status of an event.

18. The system of claim 7, wherein said event controller includes:
    a new event generator operable to generate at least one software based event.

19. The system of claim 7, wherein said digital processor and said event controller include:
    means for generating at least one software based event.

20. The system of claim 7, wherein said event controller includes:

an event priority decoder operable to generate a runnable event signal indicative of a runnable status of an event.

21. The system of claim 7, wherein said digital signal processor and said event controller include:
means for generating a runnable event signal indicative of a runnable status of an event.

22. The system of claim 7, wherein said event controller includes:
an event priority decoder operable to mask the first interrupt request signal when the first interrupt request signal is indicating the change in the highest priority runnable event among the plurality of events.

23. The system of claim 7, wherein said digital signal processor and said event controller include;
means for masking the first interrupt request signal when the first interrupt request signal is indicating the change in the highest priority runnable event among the plurality of events.

24. The system of claim 7, wherein said event controller includes:
an event priority decoder operable to generate a bit of the highest priority runnable event identification signal that is indicative of whether the first event is a new event to be serviced by said digital signal processor.

25. The system of claim 1, wherein said scheduler software module includes:
computer readable code for saving a first set of information related to an execution of a first event currently being serviced by said digital signal processor in response to the interrupt request signal indicating a first change in the highest priority runnable event among the plurality of events;
computer readable code for indicating an intent to resume an execution of the first event upon a completion of an execution of a second event identified as the highest priority runnable event; and
computer readable code for reading and saving a second set of information related to executing the second event.

26. The system of claim 25, wherein said scheduler software module further includes:
computer readable code for unmasking the interrupt request signal subsequent to reading and saving the second set of information;
computer readable code for computing an event address corresponding to the second event subsequent to unmasking the interrupt request signal; and
computer readable code for masking the interrupt request signal subsequent to computing the event address.

27. The system of claim 26, wherein said digital signal processor is operable to receive an indication by the interrupt request signal of a second change in the highest priority runnable event among the plurality of events during a time period between the unmasking of the interrupt request signal and the subsequent masking of the interrupt request signal.

28. The system of claim 26, wherein said scheduler software module further includes:
computer readable code for acknowledging the second event subsequent to the masking of the interrupt request signal.

29. The system of claim 28, wherein said scheduler software module further includes:
computer readable code for unmasking the interruption subsequent to acknowledging the second event.

30. The system of claim 28, wherein said scheduler software module further includes:
computer readable code for executing the second event subsequent to the acknowledging the second event.

31. The system of claim 25, wherein said scheduler software module further includes:
computer readable code for unmasking the interrupt request signal subsequent to reading and saving the second set of information;
computer readable code for restoring the first set of information subsequent to the unmasking of the interrupt request signal; and
computer readable code for masking the interrupt request signal subsequent to restoring the first set of information.

32. The system of claim 31, wherein said digital signal processor is operable to receive an indication by the interrupt request signal of a second change in the highest priority runnable event among the plurality of events during a time period between the unmasking of the interrupt request signal and the subsequent masking of the interrupt request signal.

33. The system of claim 31, wherein said scheduler software module further includes:
computer readable code for acknowledging the first event subsequent to the masking of the interrupt request signal.

34. The system of claim 33, wherein said scheduler software module further includes:
computer readable code for unmasking the interruption subsequent to acknowledging the first event.

35. The system of claim 34, wherein said scheduler software module further includes:
computer readable code for executing the first event subsequent to the acknowledging the first event.

* * * * *